Oct. 18, 1955  R. H. HELSEL  2,720,831
TICKET ISSUING MACHINE
Filed Dec. 29, 1948  25 Sheets-Sheet 1

INVENTOR.
REUBEN H. HELSEL
BY
*Busser & Harding*
ATTORNEYS

Oct. 18, 1955     R. H. HELSEL     2,720,831
TICKET ISSUING MACHINE
Filed Dec. 29, 1948     25 Sheets-Sheet 3
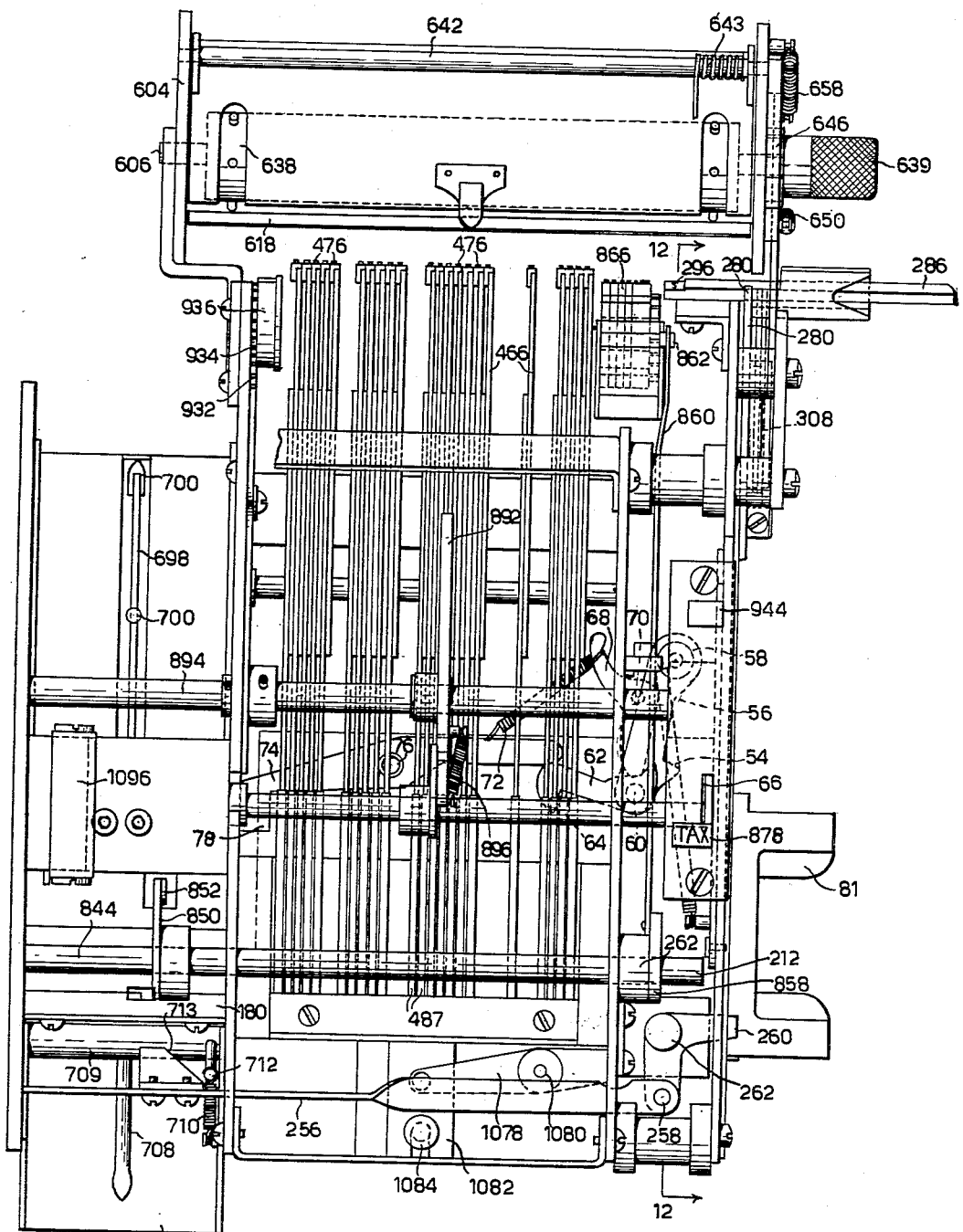
FIG. IC.
INVENTOR.
REUBEN H. HELSEL
BY
ATTORNEYS

INVENTOR.
REUBEN H. HELSEL

INVENTOR.
REUBEN H. HELSEL

Oct. 18, 1955 R. H. HELSEL 2,720,831
TICKET ISSUING MACHINE
Filed Dec. 29, 1948 25 Sheets-Sheet 10

INVENTOR.
REUBEN H. HELSEL
BY
ATTORNEYS

Oct. 18, 1955     R. H. HELSEL     2,720,831
TICKET ISSUING MACHINE
Filed Dec. 29, 1948     25 Sheets-Sheet 15

INVENTOR.
REUBEN H. HELSEL
BY
ATTORNEYS

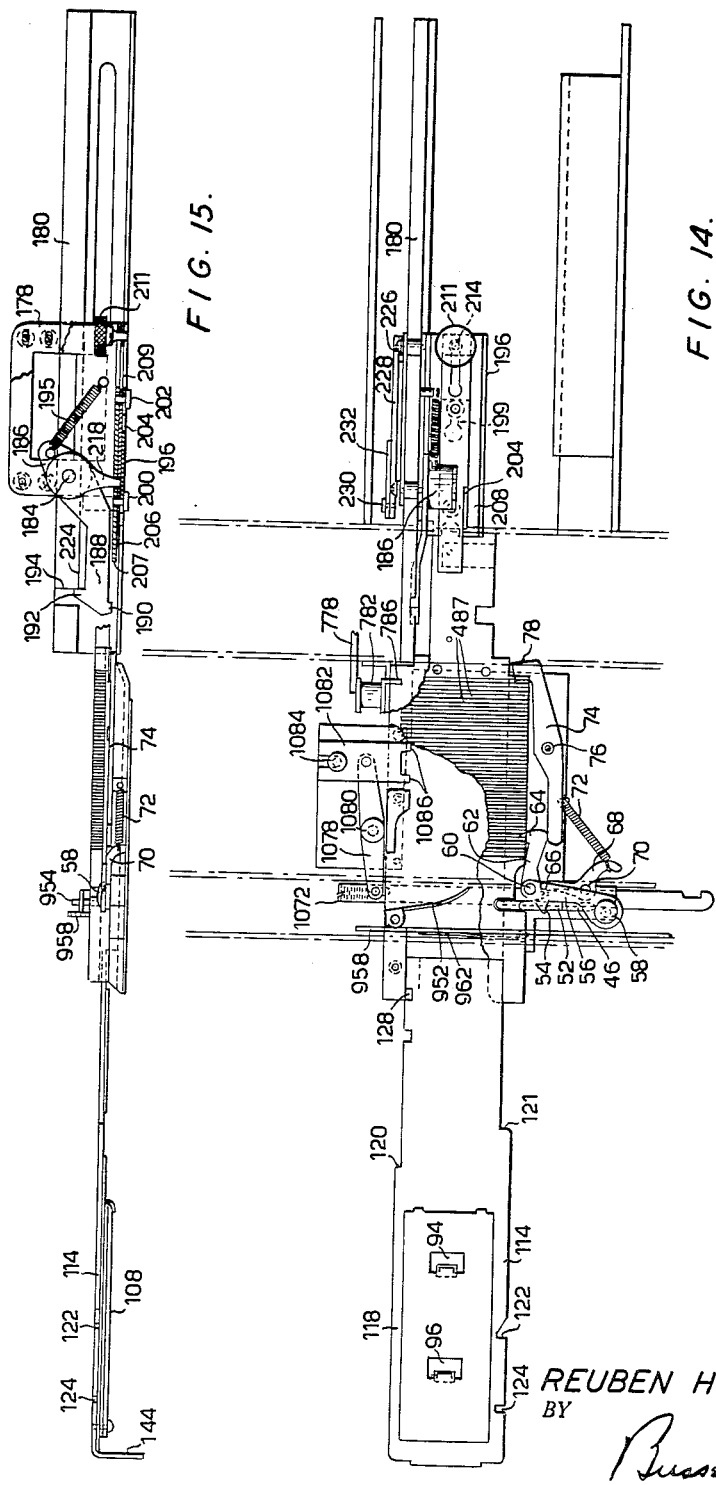

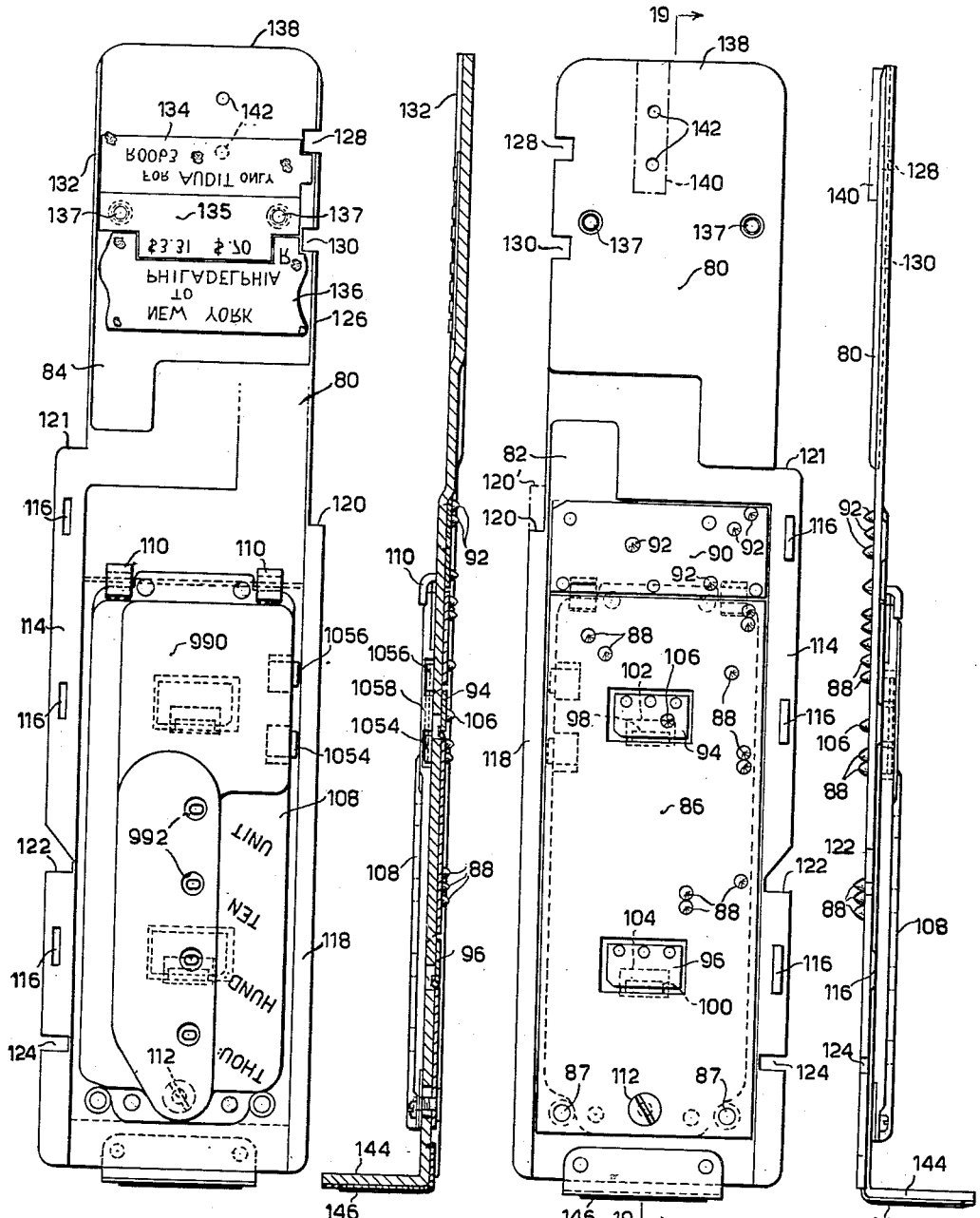

Oct. 18, 1955   R. H. HELSEL   2,720,831
TICKET ISSUING MACHINE
Filed Dec. 29, 1948   25 Sheets-Sheet 18

INVENTOR.
REUBEN H. HELSEL
BY
ATTORNEYS

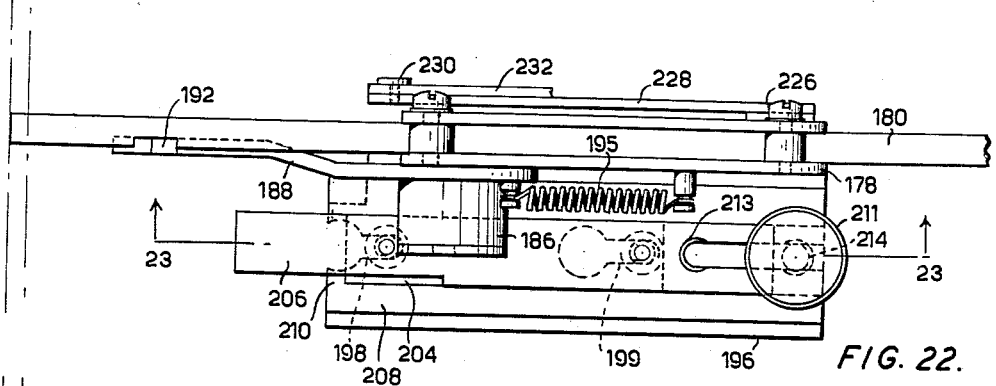

Oct. 18, 1955     R. H. HELSEL     2,720,831
TICKET ISSUING MACHINE
Filed Dec. 29, 1948     25 Sheets-Sheet 20

INVENTOR.
REUBEN H. HELSEL
BY
ATTORNEYS

Oct. 18, 1955        R. H. HELSEL        2,720,831
TICKET ISSUING MACHINE
Filed Dec. 29, 1948        25 Sheets—Sheet 21

INVENTOR.
REUBEN H. HELSEL
BY
ATTORNEYS

Oct. 18, 1955        R. H. HELSEL        2,720,831
TICKET ISSUING MACHINE
Filed Dec. 29, 1948        25 Sheets-Sheet 23

INVENTOR.
REUBEN H. HELSEL
BY
ATTORNEYS

Oct. 18, 1955  R. H. HELSEL  2,720,831
TICKET ISSUING MACHINE
Filed Dec. 29, 1948  25 Sheets-Sheet 25

INVENTOR.
REUBEN H. HELSEL
BY
ATTORNEYS

United States Patent Office 2,720,831
Patented Oct. 18, 1955

2,720,831

TICKET ISSUING MACHINE

Reuben H. Helsel, Long Island City, N. Y., assignor to General Register Corporation, Long Island City, N. Y., a corporation of New York Application December 29, 1948, Serial No. 68,001

19 Claims. (Cl. 101—68)

This invention relates to a ticket issuing machine particularly adapted for issuing transportation tickets for railroads, busses, airlines, etc. The invention, however, is also applicable to other machines which are required to print a large variety of different tickets.

The broad object of the invention is the provision of a machine for the issuance of tickets of the general type indicated. In the matter of issuing tickets for common carriers, it is particularly useful inasmuch as it avoids the necessity for stocking large numbers of tickets and it facilitates accounting of sales. At present, a station is required to stock printed tickets for all of the various destinations for which tickets may be sold from that station or alternatively must stock tickets of a semiblank type which must be filled in by stamping or writing to take care of routes or destinations which are not commonly used. The common practice with respect to railroad tickets will indicate the major advantages of the present invention. Each ticket agent in a station generally has his own individual case of tickets which is kept locked when he is off duty. He is responsible for the tickets in his case. Beyond the matter already printed on the tickets, the only step in the direction of validation thereof is the printing or writing of certain data on the ticket, commonly involving on a completely printed ticket merely the stamping of the date and the seller's code thereon. Stamped or written matter can be very easily duplicated by anyone desiring to perpetrate a fraud, and, consequently, it may be considered that the tickets represent a substantial value in money which necessitates precautions against fraud or larceny. Accounting of the sale of tickets is also quite complicated inasmuch as the tickets must be counted in order to ascertain the stock of preprinted tickets on hand, and, in the case of tickets which are filled in by writing or stamping, there must be kept stubs requiring examination for accounting purposes. In the case of any active station, it will be evident that keeping track of the tickets and insuring against theft or fraud involves much expenditure of care and labor.

In my prior application, Serial No. 634,697, filed December 13, 1945, now U. S. Patent No. 2,601,283 there is disclosed and claimed a ticket issuing machine particularly designed for the printing and issuing of tickets for transportation on a common carrier, such as a railroad, bus or airline. The machine of that application is of a type particularly designed to issue tickets of single coupon type such as are commonly used as coach tickets on railroads for transportation on a single line between stations. The machine of that application is particularly designed for the issuance of such simple tickets between points of major traffic. For example, when used in a large city, the machine may be provided with a type carrier, which, by manual manipulation, may print tickets between the station of origin and substantially all of the stations within a large radius from the city which have any major amount of traffic thereto. The machine of that application is also arranged to issue tickets upon the insertion of a slug which carries type to print tickets to less popular destinations. The machine also involves accounting devices which keep track of the tickets issued either on counters or on a record tape.

In my later application, Serial Number 758,811, filed July 3, 1947, now U. S. Patent No. 2,609,746 there is disclosed a machine embodying various principles of the machine of the foregoing application but which, from the practical standpoint, is primarily adapted for a different type of use. Whereas the machine of the first application is designed primarily to issue what might be called local tickets, or, at any rate, between destinations on the line of origin, constituting the major number of tickets issued by railroads and bus lines, and some tickets issued by airlines, the machine of the later application is designed to issue tickets of more complex type and, in particular, tickets involving multiple coupons such as are required for round trips or for long railroad or airline journeys where different carriers are involved in travel over various portions of the complete route. It will be evident that the machines of said applications overlap in their utility but different stations may have such traffic problems as would make one or the other more useful. It will, of course, be evident that a major station or terminal may well have use for both types of machines for different purposes.

The machine of the present invention constitutes an improvement on that of the second of said prior applications and the general object of the present invention may be stated to be the extension of the capabilities of said machine. To make clear the particular nature of the present invention there will be indicated those features, some of them common to both the present machine and that of the second application mentioned above, which may be regarded as characterizing the improved machine. There will be primarily stressed the issuance of tickets of multiple coupon type though, as will become evident, the machine is capable of issuing single coupon tickets of the type issued by the machine of the earlier of the prior applications referred to.

The present machine utilizes ticket stock which may be of folded or duplicate form for the purpose of providing both a ticket which may be lifted on the vehicle and a receipt for retention by the patron. Under the control of slugs which carry multiple type faces, the machine will issue in a single complete cycle of operation a multiple coupon ticket, including both ticket and receipt portions with and without special auditing coupons. A single slug may, by adjustment of the machine, be rendered capable of issuing or of not issuing an auditing coupon in a single cycle of operation. Whereas the machine of the second prior application mentioned above was limited in the number of coupons which could be issued as a single ticket, this limitation being imposed by the maximum length of a single slug which the machine could use, the present machine is capable of issuing tickets of unlimited length through the use of successive slugs. This end is accomplished by providing slugs which may selectively avoid or cause the cutting off of the ticket strip at the end of a cycle of operation. If, for example, to issue a single desired ticket two slugs are to be utilized, the first one which is used is arranged so that at the termination of the cycle which it controls the ticket strip will not be severed, a particular number of coupons being printed by this first slug. The insertion of a second slug in the machine will then effect the printing of a second set of coupons continuously following the first and will control the cutting off of the ticket strip at the end of its controlled cycle. In order that the entire ticket will bear the same serial number the counting devices in the machine are controlled in accordance with the cutting operation so that advance takes place only when the ticket strip is cut.

The coupon tickets issued in strip form have the coupons delimited by perforated lines for the removal of individual coupons. The ticket stock is preprinted to the extent of the universal matter which should appear on all tickets, for example, the name of the issuing carrier, conditions of sale, designation of certain boxes or areas in which destinations, routes, fares, taxes, etc., are to be printed, data concerned with changes of routing, etc. The machine superimposes on this printed matter certain information required for particular tickets except for such matter as is subject to such large variation in practice that it must be written in. The sole limitation on the printing which may be accomplished on the tickets is one of practicability. One or more separate slugs are provided for each type of ticket which, to a reasonble extent, is required in such numbers as would warrant the stocking of the slugs. In the majority of instances, the slugs may print complete tickets which require no entries of written matter such as tickets between major points. On the other hand, the slugs may print some matter and leave blanks in which minor stations may be written. In any event, the machine completely eliminates the necessity for maintaining stocks of tickets which, if stolen, would represent substantial loss by reason of their being readily transformed into the appearance of valid tickets. The machine, furthermore, minimizes the necessity for care and work on the part of the ticket seller in entering stations on the tickets and in looking up the transportation charges, dating the tickets, or the like. Even in the case of tickets which require a major amount of written-in data, the tickets will not be validated except by issuance from the machine.

Various features of the present invention relate to the production of records. These features may be best considered following detailed description of the construction and operation of the machine, but it may be pointed out that the present machine differs from that of the second prior application in two quite important features relating to accounting; it may print on a record strip to be retained in the machine duplicates of the data printed on all coupons of issued tickets; and it provides for totalling various items.

Since a single machine may be used by more than one ticket seller, provisions are made to insure the proper assignment of liability for ticket sales, records being made in code form of the operator issuing each ticket through the printing of the operator's code designation carried by the operator's key which must be inserted in the machine in order to render it operative for ticket issuance.

As will become clear hereafter, the machine is provided with various interlocks to prevent fraudulent or faulty issue of tickets.

Convenient coding means is provided for the purpose of designating tickets or coupons issued under varying conditions such as tickets including special rates, tax exemptions, or the like.

The foregoing general discussion will indicate the broader objects of the present invention. Various other objects thereof relate to the handling of the ticket and record strips, the production of read-out records from the machine, for example, at the opening and closing of tours of duty of a particular operator, the construction of slugs, an improved counter arrangement embodied in the slugs, and various details of the mechanism whereby the desired results are attained.

All of these objects will become apparent from the following description read in conjunction with the accompanying drawings in which:

Figure 1C is a plan view of the right-hand portion of the machine;

Figure 14 is a fragmentary plan view showing certain elements cooperating with a slug;

Figure 15 is an elevation, partly in section, showing the elements illustrated in Figure 14;

Figure 16 is a top plan view of a typical slug such as is used for control of the machine;

Figure 17 is a bottom plan view of the same;

Figure 18 is a side elevation looking at the right of Figure 16;

Figure 19 is a section taken on the plane indicated at 19—19 in Figure 16;

Figure 22 is a plan view of certain parts cooperating with a slug to control cutting of the ticket strip;

Figure 23 is a vertical section taken on the plane indicated at 23—23 in Figure 22;

Figure 24 is an elevation of a card designed to be inserted into the machine for the printing of totals;

Figure 29 is a plan view showing the interconnections of certain elements adapted for the printing of code and tax designations;

Figure 30 is a section taken on the plane indicated at 30—30 in Figure 29;

Figure 1A:
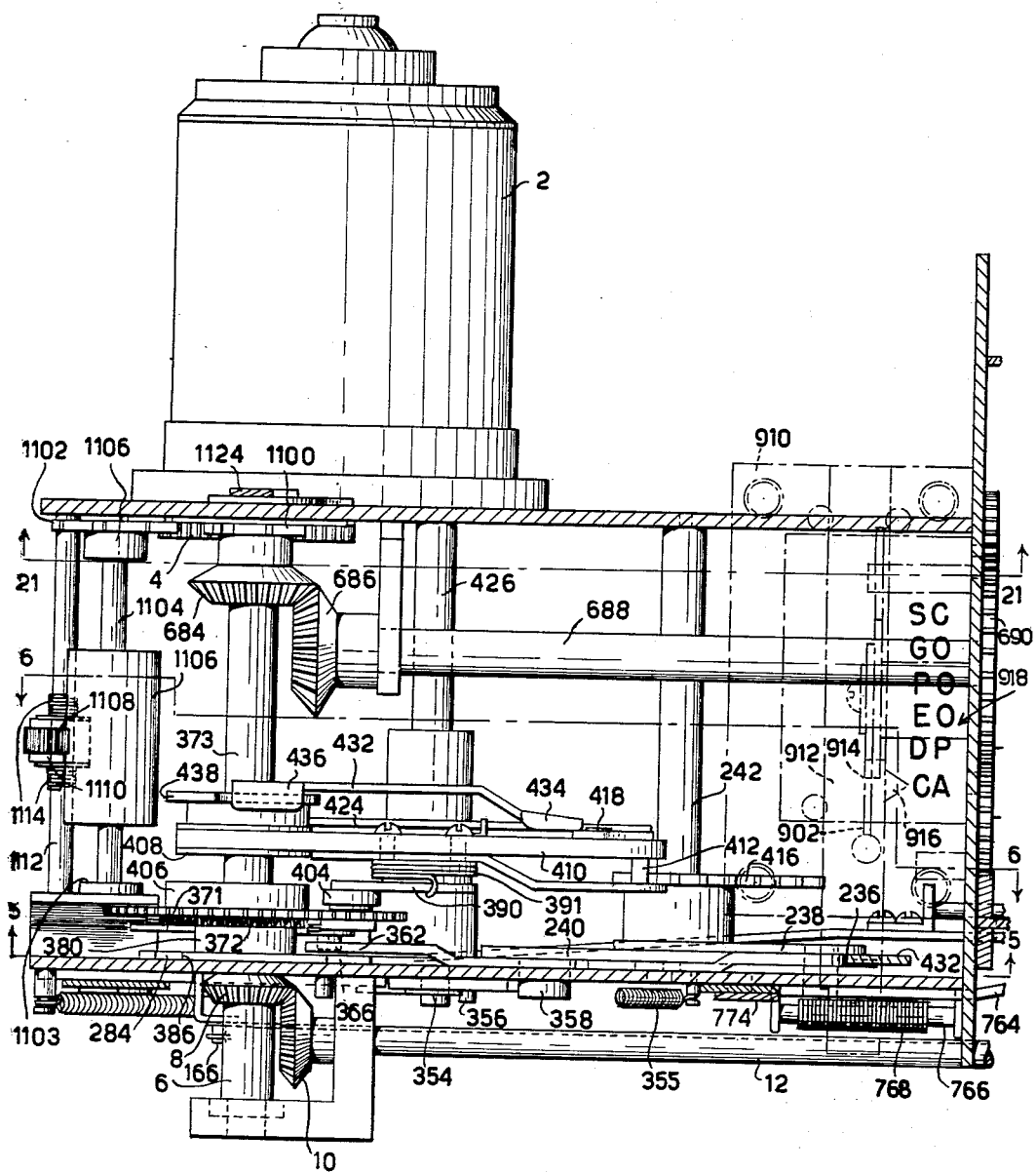
Figure 1A is a horizontal section through the left-hand portion of the mechanism, some of the upper parts being removed to show lower details.

The operating mechanism of the machine is mounted in a frame largely made up of connected plates which will be evident from the drawings and need not be described in detail. Power for operation is derived from a motor 2 which drives through reduction gearing indicated at 4, a shaft 6, the outer end of which is provided with a bevel pinion 8 meshing with a second bevel pinion 10 to drive the shaft 12. A pinion 14 on the shaft 12 is arranged to drive a gear clutch of the type illustrated in my Patent 2,309,191, dated January 26, 1943. As illustrated best in Figure 4 the clutch comprises a gear 16 having a portion of its periphery cut away at 18 and carrying a gear segment 20 pivoted to it at 22 and adapted to move through a limited range defined by engagement of a pin 28 carried by the gear 16 with the sides of an opening 26 provided in the segment. A spring 29 urges the segment in a clockwise direction as viewed in Figure 4. A pin 24 carried by the segment is arranged to be arrested, as will shortly appear, to disengage the segment from the pinion 14. When released the segment meshes with the pinion 14 and then forms a continuous toothed periphery for the gear 16. A second gear 32 is carried by the shaft 30 of the gear 16 and meshes with a gear 34 secured to a shaft 36.

A multiple-armed lever 38 is pivoted on a stud 39 secured in the frame. One arm 40 of this lever 38 is provided with a hook portion adapted to be engaged by the pin 24 and to restrain this pin and the segment 20 to disengage the clutch. A second arm 42 of the lever is connected through a link 44 to a lever 46 pivoted on a stud 48 secured in the frame and urged counterclockwise as viewed in Figure 4 by a spring 50.

A projection 52 on the upper end of the lever 46 is normally restrained by a shoulder 54 on a lever 56 pivoted at 58 in the frame as indicated in Figure 14. To the free end of the lever 56 there is pivoted at 60 a second lever 62 having a hook 64 and a step 66, the latter engageable by one end of a lever 68 pivoted to the frame at 70 and urged in a counterclockwise direction as viewed in Figure 14 by a spring 72. Another lever 74 pivoted at 76 to the frame is provided with a nose 78 and is arranged to engage the lever 62 for a purpose which will be hereafter apparent.

The machine is adapted to be operated and to effect selective operations through the insertion into a guideway 81 (see Figures 1C and 2B) of slugs 80 typified in Figures 14 to 19, inclusive. These slugs may vary considerably in construction as will be more fully described hereafter. They have, however, certain common structural characteristics taking part in initiation and control of operation of the machine which will now be described.

Each of the slugs 80 comprises a strip of sheet metal which is pressed downwardly at 82 to form a depression in its upper side and is pressed upwardly at 84 to form a depression in its lower side. In the depression 82 there is located a plate 86 formed with upwardly extending projections or pips 88 in predetermined positions thereon for control purposes as hereafter described. This plate 86 is secured by rivets 87, which may take the form of tubular extrusions from the plate, so as to be removable and replaceable by another plate if the fare or tax is changed. A separate small plate 90 also carries upwardly extending projections 92. Being permanent, this plate may be spot welded to the slug body. Small plates 94 and 96 are spot welded to the slug in rectangular openings in the plate 86 and one or both of these plates 94 and 96 may be provided with upwardly extending projections such as indicated at 106. Ears 98 and 100 formed on the plate 86 extend downwardly beneath the plates 94 and 96 to effect anchorage of the plate 86 in position in addition to the rivets 87. The body of the slug is cut away as indicated at 102 and 104 to receive these ears.

To the lower side of the slug there is secured a counter 108 which will be hereafter described in greater detail. This is held in position by ears 110 and a screw 112 threaded into the counter.

The slug is provided with laterally extending flanges 114 and 118. The inner end 120 of the latter controls the cutting of a ticket strip. If, as will appear hereafter, a slug is not intended to effect cutting of the ticket strip, the end of its flange 118 is extended as indicated at 120'.

The flange 114 has an active end 121 and is provided with notches 122 and 124 of the shapes indicated in Figures 16 and 17. In order to secure a snug fit as the slug is inserted in the machine to prevent its being too loose therein and binding in the guideways the flange 114 is provided with depressed projections 116 extending longitudinally of the flange.

At its inner end and at one side thereof the slug is provided with a downwardly turned flange 126 provided with a pair of notches 128 and 130. At its other side it is provided with a downwardly turned flange 132. Between these flanges there are spot welded printing plates 134 and 136. A plate 135 complements plate 136 by carrying fare and/or tax designations. This plate 135 is riveted to the slug body at 137 so that it may be readily removed and replaced by a similar plate if the fare or tax is changed. As will appear hereafter the length of the inner portion of the slug may vary depending upon the number of ticket coupons which it is intended to print and may then carry different numbers of printing plates such as 134 and 136. As will also appear hereafter the innermost end plate 134 may be caused to print or not to print as determined by an authorized person having access to the interior of the machine. The inner end 138 of the slug has a definite relationship to the innermost printing plate 134 and to the notches 128 and 130. Its relationship to the end 121 of the flange 114 is subject to variation dependent upon the number of printing plates on the slug.

As will be described hereafter, an adjustment of the machine provides for printing or non-printing by the innermost printing plate. However, it is sometimes desirable to insure printing of the innermost plate even though the machine is normally adjusted for non-printing by this plate. If a slug is of the type for which printing by the plate 134 should always occur its top surface at the end 138 may have secured thereto by rivets passing into openings 142 a small plate 140 which is illustrated in construction lines in Figures 16 and 17.

The outer end of the slug is downturned as indicated at 144 and has secured thereto a tab 146 which may carry printed matter to identify the slug, these slugs being arranged to be carried in a rack convenient to the operator of the machine with these tabs 146 exposed to view. The turned end 144 is arranged to be conveniently grasped by the operator to insert the slug in the machine.

To the extent of cooperation of the parts heretofore described the events which occur upon insertion of the slug may be described as follows:

The first event of significance which occurs on insertion of the slug is engagement of the nose 78 of lever 74 by the shoulder or ledge 121 of the flange 114 whereby the lever 74 is rocked clockwise and causes a counterclockwise movement of the lever 62 against the action of the spring 72 to cause engagement of the nose 64 in the notch 122. The further insertion of the slug then carries the lever 62 with it rocking the lever 56 and causing shoulder 54 to disengage the projection 52 on the lever 46. The lever 46 is thus permitted to have a counterclockwise movement as viewed in Figure 4 under the action of spring 50 resulting in counterclockwise motion of the lever 38 to release the pin 24 and cause engagement of the clutch by meshing of the segment 20 with the pinion 14. The nose 43 of the lever 46 simultaneously enters the slot 124 in the slug, the location in a slot in the side of the guideway preventing possible lateral movement of the lever 46 so that the slug is securely held.

Figure 4:
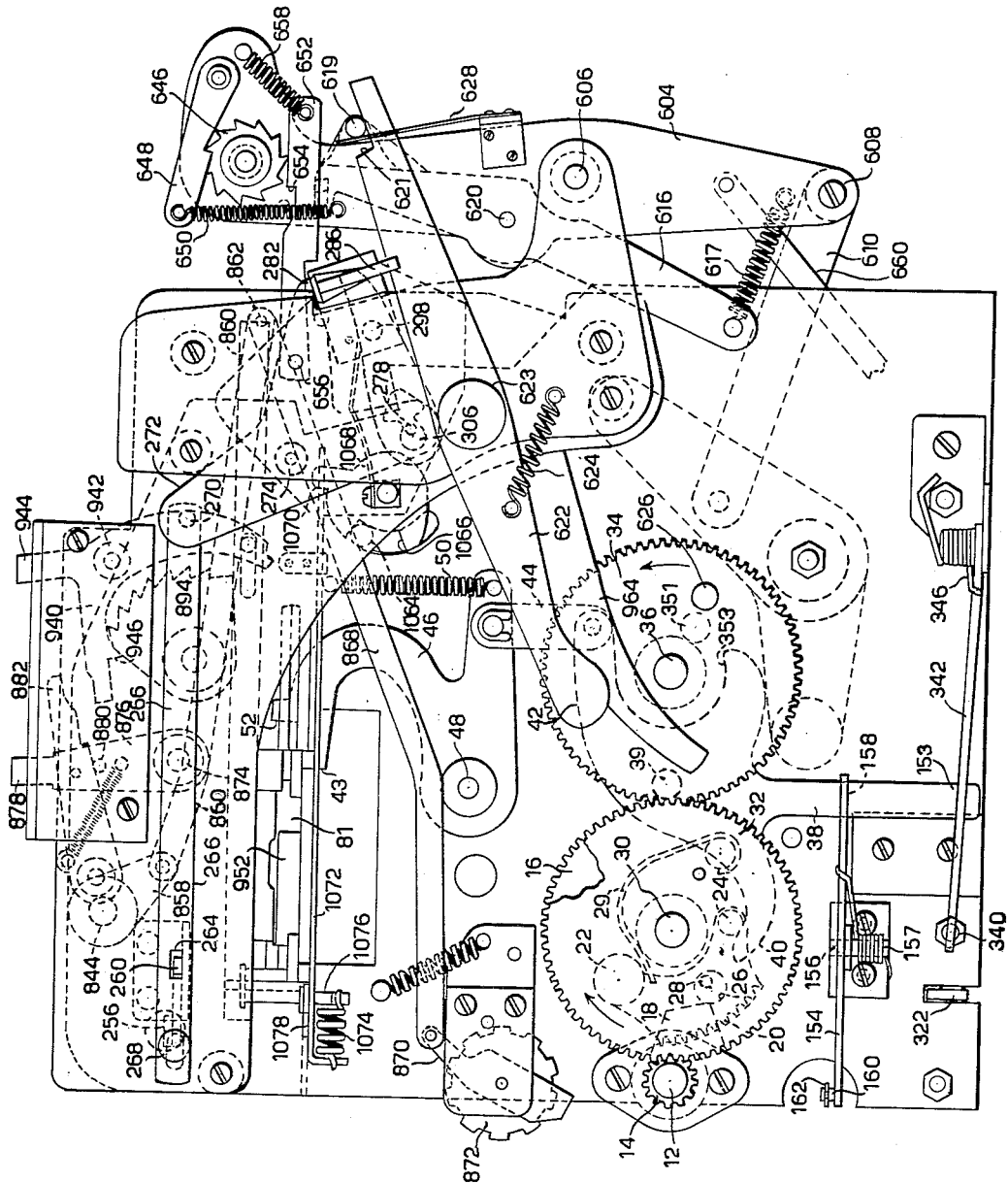
Figure 4 is an elevation of the right-hand end of the machine.

The depending arm 153 of the lever 38 moves toward the right as viewed in Figure 4 and is followed by the bevelled edge 158 of the lever 154 which is pivoted at 156 and urged counterclockwise as viewed in plan by a spring 157. Its end opposite the bevel 158 is provided with a pin 160 which is embraced by the elongated looped end 162 of a rod 164 which is pivoted to a pin 166 carried by the pivoted arm 168 of a switch 170, which arm carries movable contacts 172 engageable with fixed contacts 174 carried by a stationary member 176 to close the circuit of the motor 2. A spring 169 normally urges the arm 168 to switch-opening position.

A slide 178 is mounted for reciprocation in a guideway 180. An upwardly extending portion of this slide supports on a pivot pin 184 a hub 186 carrying a lever 188 which is provided with a downwardly projecting nose 190 arranged for engagement in one of the slots 128 or 130 of a slug and with an upwardly projecting hook 192 which engages the edge 194 of a slot in the guideway. A spring 195 urges the hub 186 in a clockwise direction as viewed in Figure 6.

Slide 178 has a lateral extension 196 which is provided with longitudinal slots 197, 198 and 199. Shoulder studs 200 and 202 pass through the slots 198 and 199 and through holes in a rectangular plate 204 and are threaded into openings in a plate 206, the left-hand end 207 of which provides an abutment as hereafter described. The rectangular plate 204 lies in the rectangular opening 209 in a rectangular plate 208 which is located between plate 206 and the extension 196 of the slide. The left-hand end 210 of the plate 208 also provides an abutment. A screw 211 having a conical shank is threaded into the plate 208 and is adapted to be longitudinally adjusted in a slot 212 in the plate 207, being retained in the ends thereof which are enlarged and conical to receive the shank of the screw as indicated at 213 and 214. The plates 204 and 206 are provided with alignment openings indicated at 216 for the reception of an arm 218 depending from the hub 186.

Assuming the parts to be in the positions illustrated in Figures 22 and 23 and assuming that there is entered into the machine a slug which does not carry the member 140, the end 138 of this slug as it enters into the machine will pass beneath the plate 206 and will abut the end 210 of the plate 208. As it does so, it will move the plate 208, the plate 206 and the plate 204 slightly toward the right as viewed in these figures relative to the slide 178 with resulting rocking of the hub 186 counterclockwise to release the hook 192 from the notch 194 and cause the hook 190 to move into the slot 130 in the slug. Continuation of the movement will then move the slide to the right as will be hereafter more fully described.

On the other hand, assume that the screw 211 is moved to the left-end end of the slot 212 and is seated in the conical portion 213 of this slot so as to carry the end 210 of the plate 208 to the left in alignment with the abutment end 207 of the plate 206. In this case engagement of the end 138 of the slug with the abutment 210 will occur somewhat earlier, again producing rocking of the hub 186 to rock the lever 188 but this time with the result of entering the hook 190 in the slot 128 of the slug. As will become evident hereafter, the result of this will be to give to the slide 178 an ultimate motion in excess of that imparted under the conditions previously mentioned.

A third situation arises if the parts are in the positions illustrated in Figures 22 and 23 if a slug is inserted which carries a member 140 on its upper surface. Under these conditions, when the slug enters the machine the member 140 will engage the abutment end 207 of the plate 206 with results identical with those of the last mentioned case resulting in lowering of the hook 190 into the slot 128 of the slug with corresponding imparting to the slide of a greater ultimate movement toward the right. As will become apparent hereafter the last two conditions will give rise to the printing of audit stubs (or other terminal coupons) whereas the first condition will result in the non-issuance of such stubs. The members 140 are provided in the case of certain slugs which, for certain purposes, should always produce audit stubs or other coupons printed by a terminal plate irrespective of the setting of the screw 211 in a position which, in the case of slugs not carrying the member 140, would result in the issuance of tickets without audit stubs. To summarize, when the conditions are such that the hook 190 enters the slot 128 an audit stub will be issued; whereas when the hook enters a slot 130 of the slug an audit stub will not be issued.

After the hook 192 is released from the notch 194 the hook 192 will move beneath the ledge 224 of the guideway so that the hook 190 cannot be disengaged from the slot 128 or 130 into which it has entered, the result being that the slug cannot be withdrawn until the completion of a cycle of operation (if started by full inward movement of a slug) which again returns the hook 192 into the notch 194 to permit the lever 188 to rock upwardly to disengage the slug.

Pivoted to the slide 178 at 226 is a link 228 which is pivoted at 230 to the bell crank 232 mounted on a pin 236 carried by an arm 238 secured to a disc 240 journalled on a pin 242. One of a pair of rollers 234 carried by the lower arm of the bell crank 232 projects through a cam slot 246 in one of the vertical plates of the frame and a second roller 234, concentric with the first, underlies a lever 248 pivoted at 249 which is provided with a lower edge 252 terminating in a socket 250 in which the roller 234 rests when the mechanism is in idle position. The cam slot 246 is so shaped in the light of the arrangement of the link 228, the bell crank 232 and the arm 238 that the angular movement of the disc 240 is proportional to the linear movement of the slide 178. A spring 251 normally urges the lever 248 in a counterclockwise direction as viewed in Figure 2A.

Figures 28, 31:
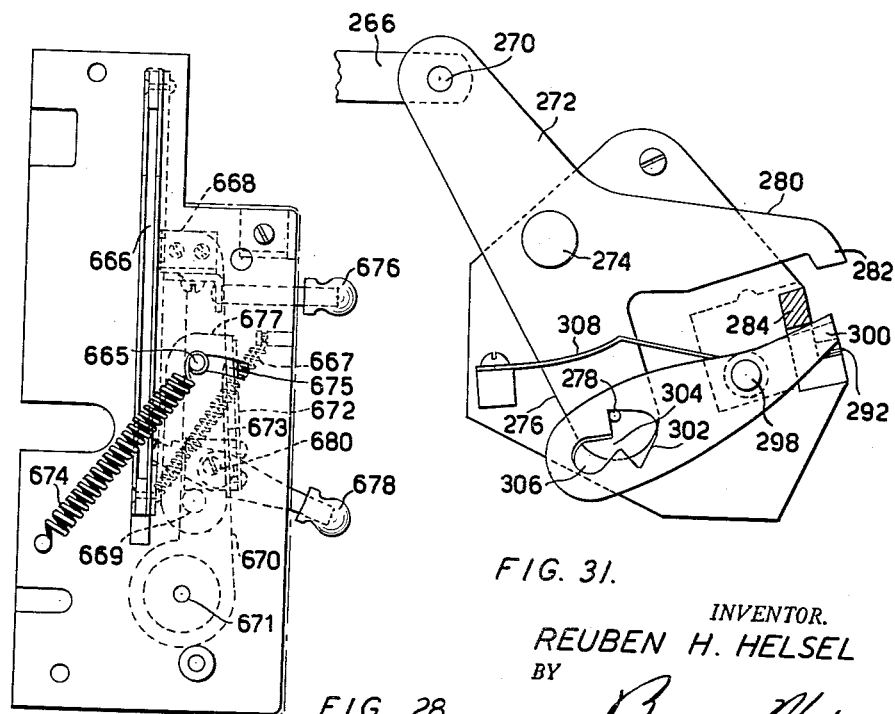
Figure 28 is an elevation looking at the left of Figure 27.
Figures 31 and 32 are elevations showing certain elements cooperating with an operator's key.
Figure 32:
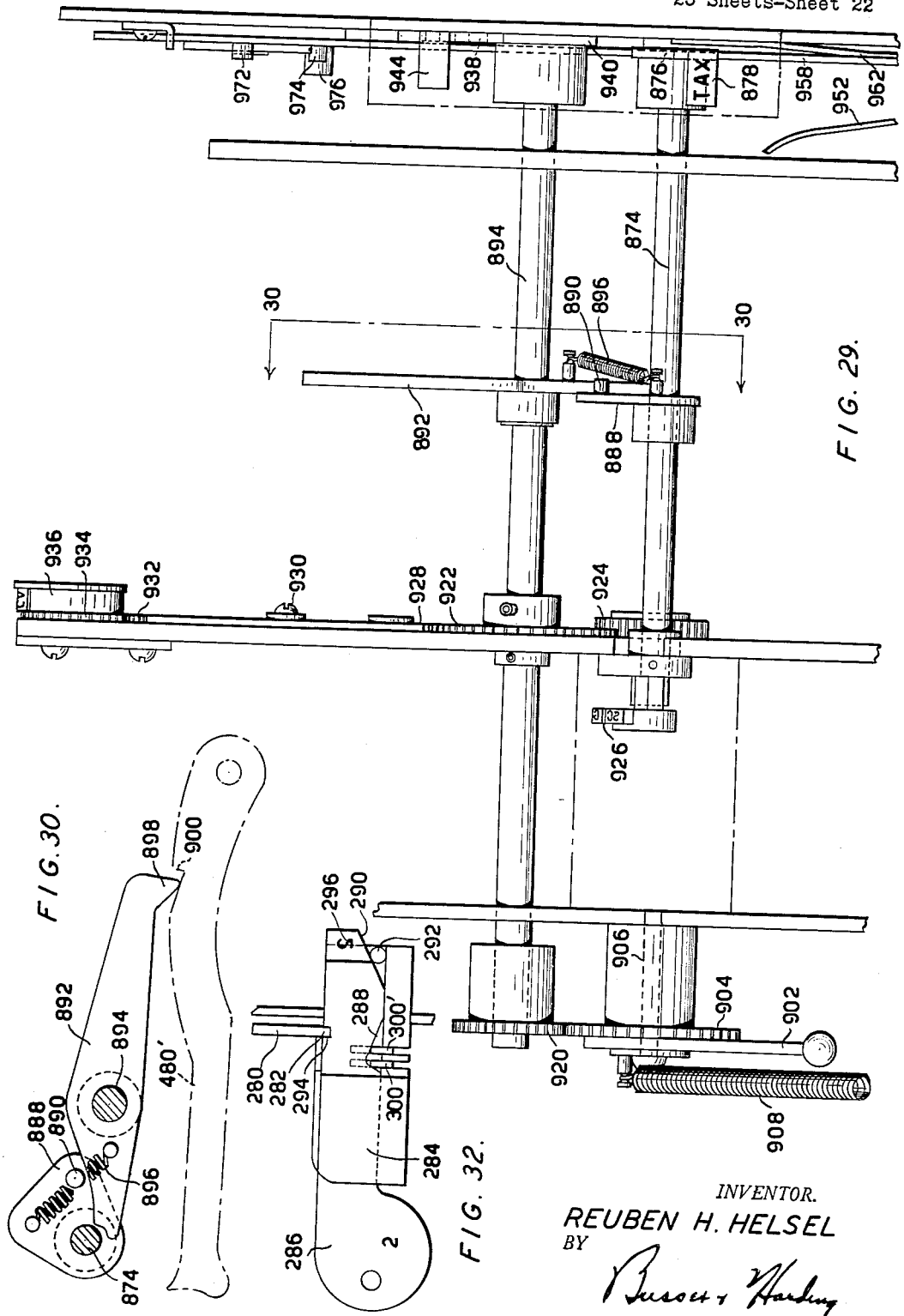

Pivoted to the lever 248 at 254 is a link 256 which is, in turn, pivoted at 258 to one arm of a bell crank 260 pivoted on a fixed stud 262 and having its other arm engageable within a slot 264 in a link 266 which is slotted at its left-hand end as viewed in Figure 4 to embrace a fixed stud 268. This link is pivoted at 270 to a lever 272 journalled on a fixed pin 274. A depending arm 276 of this lever carries a laterally extending pin 278 while an arm 280 extending to the right in Figure 31 is provided with a nose 282.

A member 284 provides a guideway for the reception of an operator's key 286 which may be used to unlock the machine. The lower edge of this key is provided with a selective contour 288 and at its leading portion the key is bevelled at 290 to slide over an arresting pin 292 which limits its inward movement. The upper edge of the key is provided with a notch 294. At its inner end the key is provided with a type face 296 which may take the form, for example, of a numeral corresponding to an operator authorized to use the machine.

Pivoted on a fixed pin 298 are a pair of levers 300 and 300' which are guided in slots in the member 284. These levers are provided with openings including a wide portion 302, a narrow neck 304 and another wide portion 306. The neck 304 is of a size just slightly larger than the pin 278. The ends of the levers 300 and 300' opposite the openings are selectively shaped to cooperate with the contour 288 of the key. A spring 308 having individual fingers engageable with the levers 300 and 300′ normally urge these levers in a counterclockwise direction as viewed in Figure 31.

The locking of the mechanism may now be described. When no key is in position in the machine the levers 300 and 300′ will occupy the positions illustrated in Figure 31 with the result that the pin 278 will be located in the tops of the portions 302 of the openings therein. The result is that the machine is completely locked since, the lever 272 being prevented from clockwise movement it will, through its connections, prevent clockwise movement, as viewed in Figure 2A, of the lever 248, preventing the roller 234 from moving away from the end of the cam slot 246, this, in turn, preventing movement of the slide 178 and accordingly preventing entrance of the slug beyond the point of starting movement of slide 178. On the other hand, if a proper key is inserted in position with a contour 288 corresponding to the shaping of the ends of the levers 300 and 300′ which it engages these levers will be rocked to the positions illustrated in Figure 4 in which the neck 304 will be in alignment with the path of motion of the pin 278 when the lever 272 is rocked. In such case when the slug is inserted the slide 178 may be normally moved with corresponding movement of the roller 234 in the slot 246, the lever 248 yielding to permit this movement. As the lever 248 is rocked the lever 272 is correspondingly rocked to cause the pin 278 to move through the necks 304 into the portions 306 of the openings. At the same time the nose 282 of the lever 272 enters the notch 294 in the upper edge of the key, locking the key in position so that it cannot be removed until the slug is backed out sufficiently to restore the roller 234 to the initial end of the slot 246. Insurance is thus attained that if the machine goes through its cycle of operation the operator's designation at 296 will necessarily be printed.

Figure 10:
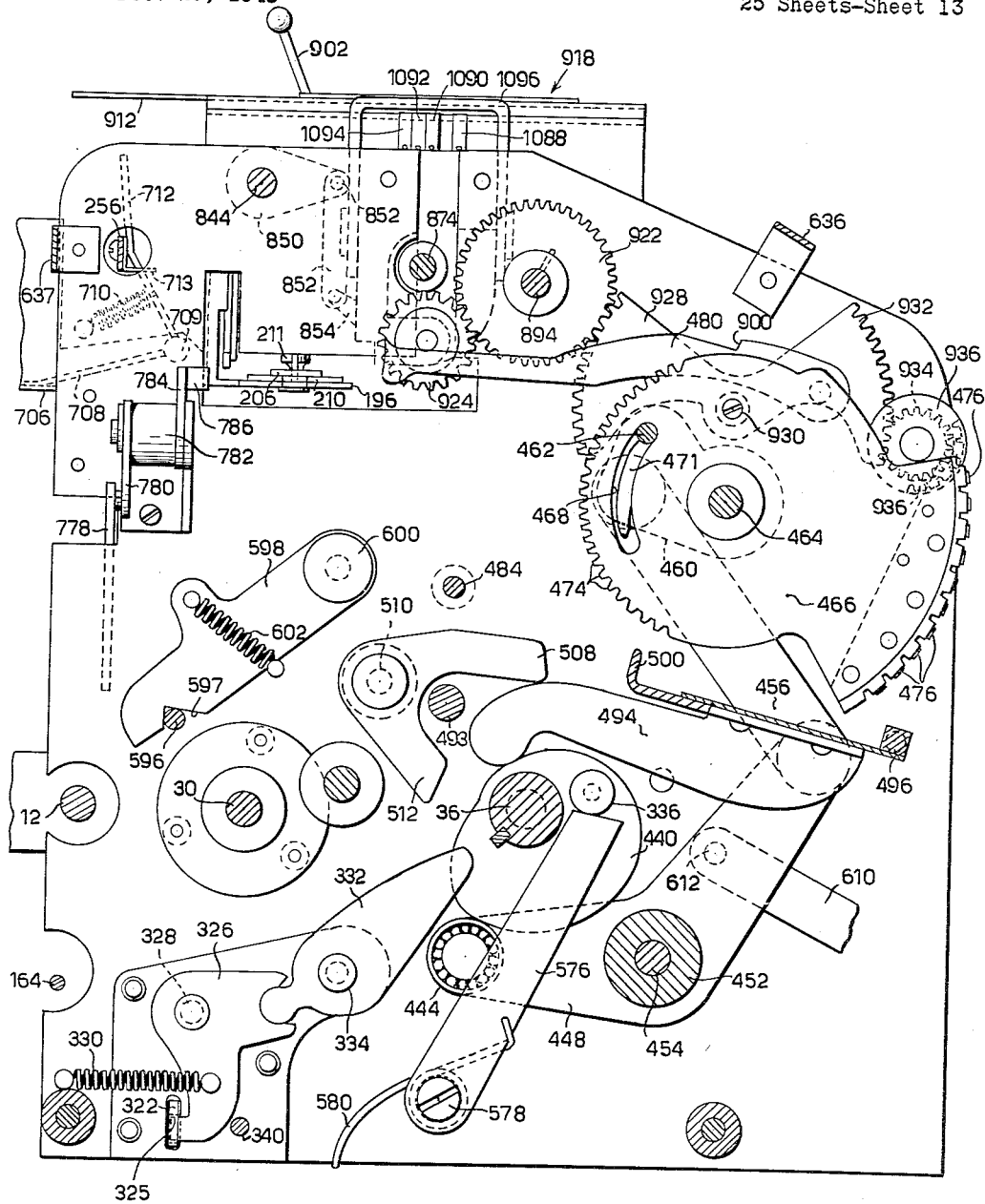
Figure 10 is a vertical section taken on the broken surface indicated at 10—10 in Figure 1B.

A pin 310 carried by the disc 240 is adjacent to, but clears, the end of the arm 312 of a lever 314 when the machine is in rest position and is carried angularly clear of this arm 312 when the slug is moved into the machine. The lever 314 is pivoted at 316 and has a depending arm 318 pivoted at 320 to a link 322 which extends toward the right of the machine, being urged toward the left by a spring 324. The link 322 is provided with a shoulder 325 which is arranged to be arrested by the lower end of a lever 326 (Figure 10) pivoted at 328 and linked to a second lever 332 pivoted at 334 arranged to be engaged during the operation of the machine by a rotating pin 336. The link 322 carries an abutment bracket 338 engageable with a rod 340 guided in the frame with its right-hand end abutting the free end of a lever 342 pivoted at 344 and urged in a clockwise direction as viewed in Figure 1B by a spring 346. The lever 342 is provided with a shoulder 348 which at proper times serves to arrest movement of the depending arm 153 of lever 38.

Though the pin 310 clears the end 312 of lever 314 upon insertion of a slug this lever is restrained from rocking by latching of the link 322 by lever 326. In the operation of the machine, however, this latching action is disturbed and the spring 324 is then effective to act through the link 322 to rock the lever 314 clockwise as viewed in Figure 5.

A lever 352 pivoted at 354 is urged clockwise by a spring 355 and is provided with a socket 360 at its end arranged to embrace partially a roller 358 carried by the disc 240. This arrangement serves as a yielding latch which will normally hold the disc in its initial position but which will yield against the action of inserting the slug. After roller 358 moves below socket 360, lever 352 under the action of spring 355 aids counterclockwise movement of disc 240 thus minimizing the force necessary to move the slug inwardly.

An upwardly extending arm 362 of the lever 314 provides a socket 364 to arrest a pin 366 carried by a gear segment 368 which is pivoted at 370 to a gear 371 having its contour interrupted at the location of the segment 368. A spring 372 reacts between the segment and the gear 371 to urge the segment in a clockwise direction as viewed in Figure 5. Fundamentally, the segment and gear provide a clutch similar to that previously described which is adapted to engage the pinion 375 carried by the shaft 6 when the clutch is tripped.

Figure 5:
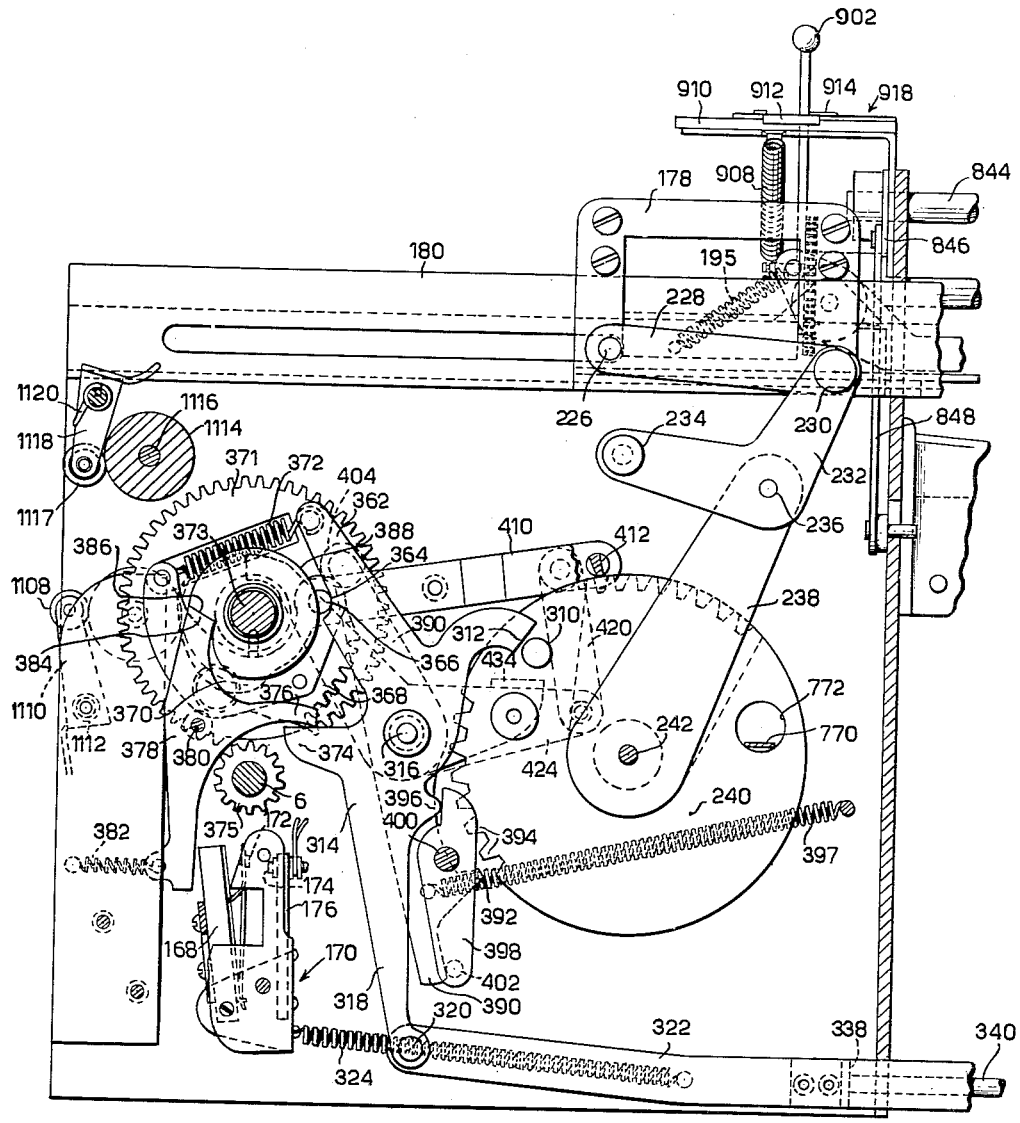
Figure 5 is a vertical section of the left-hand portion of the machine taken inside the front plate of the frame, the section being taken on the vertical plane indicated at 5—5 in Figure 1A.

An arm 374 on the lever 314 engages the arm 376 of a lever 378 pivoted to the frame at 380 and urged clockwise as viewed in Figure 5 by a spring 382. The depending arm of this lever is arranged to engage the movable plate 168 of the switch 170 and is arranged to hold it closed when closure is not effected through the link 164 during the cycle of operation. An upwardly extending arm 384 of lever 378 engages beneath the shoulder 386 of a cam 388 when the mechanism is at rest to prevent retrograde movement of the shaft 373 of the gear 371. This cam serves during the final portion of a cycle of operation to hold the switch closed until the shaft 373 has arrived at its final rest position, acting upon the arm 384 to effect this result.

A lever 390 also pivoted on the pin 316 is provided with a tooth 392 which is adapted to fit the spaces between the teeth 394 formed in the periphery of the disc 240. A nose 396 on the lever 314 is arranged to engage the upper end of a lever 398 pivoted to the frame at 400. A pin 402 carried by the lever 398 is arranged to engage a tail extension of the lever 390. At its upper end the lever 390 carries the roller 404 adapted to be acted upon by a cam 406 carried by the shaft 373 (see Figure 1A). A spring 391 urges the roller 404 towards this cam.

The shaft 373 carries an eccentric 408, the strap 410 of which is provided with a tooth 412 arranged to engage and advance the teeth 414 on a segment 416 secured to the disc 240. To the strap 410 there is pivoted at 418 a link 420 which is pivoted at 422 to a lever 424 pivoted to the frame at 426 and provided with a follower pin 428 engageable by a cam 438 on the shaft 373.

A bell crank 432 also pivoted to the frame at 426 is provided with a laterally turned ear 434 engageable over the lever 424 and is also provided with a laterally turned end 436 engageable by cam 438.

Cams 440 and 442 carried by shaft 36 operate respectively on rollers 444 and 446 carried by levers 448 and 450 having a common hub 452 journalled on a fixed pin 454. The upper ends of these levers are connected by links 456 and 458 to arms 460 and 461 which are journalled upon a fixed pin 464 and are joined by a pin 462 arranged parallel to the axis of the pin 464. Also journalled on the pin 464 are a group of plates 466 provided with arcuate slots 468 through which the pin 462 extends. To each plate 466 there is pivoted at 473 a latch member 471 acted upon by a spring 472 and provided with a shoulder which maintains yieldingly each plate in position with pin 462 in the upper end of slot 468. The plates 466 are thus latched to the pin 462 to partake of movements of the pin. However, if any plate is positively arrested as hereafter pointed out, its latch 471 will yield so that the pin 462 may move downwardly in its slot 468. Each of the plates is provided with teeth 474 and with type members 476 some of which, as will hereafter appear, carry consecutive numbers while others carry letters or other code characters. It may be pointed out that these type members 476 are intended to print upon a record strip to record the significant data of each ticket issued by the machine. Certain of the plates 466 are associated adjacent each other to print numerical amounts corresponding to the tickets issued. As will presently appear the plates of this type are associated with accumulators which serve to indicate, and, at desired times, print, totals of the monetary or other numerical amounts which are printed upon the issue of each ticket. Those plates which merely print code matters are, of course, not associated with accumulators. At 478 there is pivoted to each plate 466 a finger 480 which is arranged to engage the projections such as 88, 92, and 106 previously described as carried by the slugs. It will suffice at this point to mention that the rocking of the pin 462 in a clockwise direction as viewed in Figure 9 will yieldingly carry through the latches 471 each of the plates 466 in a corresponding clockwise direction until its finger 480 rides upon one of the projections on the slug whereupon the plate will be arrested, the latches nevertheless permitting a full stroke of movement of the pin 462 under the action of the driving cams 440 and 442.

The arresting action just mentioned is effected by reason of the fact that as the end of a finger 480 rises over a projection its pointed upper end will engage one of a series of serrations 481 of a plate 483, these serrations extending longitudinally of the slug guideway. There are ten of these which, in order from left to right of Figure 9, stop a finger to effect no printing and the printing of numerals 0 to 8, inclusive. The ends 485 of finger guide slots 487 arrest the fingers (without requiring projections on the slugs) to print 9. Spring leaves 489 urge the fingers downwardly.

Each of the plates 466 arranged to control an accumulator is associated with an individual gear segment 482 pivoted on a pin 484, the teeth of each segment meshing with those of its corresponding plate 466. Associated with each of the gear segments 482, and stacked between them, is a second gear segment 486 also pivoted on the pin 484. Each of the gear segments 486 is provided with a slot 490 receiving a pin 488 of the corresponding gear segment 482. Individual springs 492 act between the gear segments of each pair tending to separate their upper ends; but a common stop pin 493 limits the counterclockwise movement of each segment 486, so that, when the parts are in rest position as in Figure 11, each pin 488 is in the upper end of its corresponding slot 490 instead of in the lower end towards which the spring 492 would normally urge it.

A cam follower arm 494 engageable by the cam 440 is secured to a plate 498 which is pivoted on a pin 496 journalled in the frame. A plate 500 provided with an upturned edge is carried by the pin 496 and is urged upwardly against the plate by a spring 504 confined under the head of a screw 506. The upturned edge of the plate 500 is arranged to engage between the teeth 474 of all of the plates 466 to insure definite indexing of these plates and to hold them against rotation during the printing operations by the type elements 476. A bell crank has an upper arm 508 overlying the arm 494 and also has a second arm 512 adapted to be acted upon by the cam 440 to insure positive removal of the upturned end of the plate 500 from between the teeth 474 during the cycle of operation. This bell crank is pivoted on a pin 510.

The accumulators mentioned above, of which there are three in the present machine, are mounted between plates 514 forming a frame which is pivoted on a fixed pin 516 and carries follower rollers 518 and 520 acted upon by cams 522 and 524 carried by the shaft 36, which cams insure positive rocking movements of this frame in both directions. The rocking movements are for the purpose of bringing into and out of mesh with the gear segments 486 corresponding individual gears 526 mounted on a pin 527 in the rocking frame. The accumulators are similar and the following description of their construction will be applied to a single one. There may correspond to such an accumulator, for example, four gear segments 486 coresponding to units, tens, hundreds and thousands. In the accumulator, however, depending upon the totals expected to be reached there will be a greater number of the gears 526, some of which will accordingly not mesh with segments 486. As an example, there may be an accumulator associated with four of the segments 486 and seven or eight gears 526 to permit ample totals to be accumulated.

Meshing with each of the gears 526 is a ten-tooth pinion 528, these pinions being journalled on a pin 534 carried by the accumulator frame. To each of these pinions is secured a numbering wheel 530 provided with ten number printing elements 532. Individual detents 536 are arranged to engage between the teeth of the pinions 528 under the action of individual leaves of a spring 538, these detents being pivoted on a pin 537.

On a pin 540 carried by the accumulator frame there are journalled pinions 542 meshing with each of the wheels 526, each of these pinions having ten teeth. To each of the pinions 542 there is secured a disc 544 provided with a nose 546 arranged to engage the upper end of an individual lever 548 pivoted on a common transverse pin 550 carried by the accumulator frame and normally urged clockwise, as viewed in Figure 11, by its individual leaf of a spring 552. The lower end 554 of each lever 548 acts as a detent for shoulder 556 of a corresponding individual lever 558 provided with a cam follower portion 562. These levers 558 are pivoted on a pin 560 carried by the accumulator frame. Each lever 558 has pivoted to it at 564 a pawl 566 which is pulled clockwise and downwardly as viewed in Figure 11 by an individual spring 568. Each pawl has a nose 570 engageable with a gear 526.

The arrangement of the pawl 566 is such that each pawl engages the teeth of the gear 526 corresponding to the next higher order than that of the gear 526 which controls it through a pinion 542, nose 546, lever 548 and lever 558. These pawls are arranged to provide carrying from one order to the next higher order each time the former order passes through 9 to 0.

A cam member 572 is provided with stepped cams 574 which are arranged to act upon the cam follower portions 562 of the levers 558.

A pinion 584 carried by the shaft 12 is arranged to drive at proper times a gear 586 the teeth of which are interrupted at 594. The cam member 572 is secured to this gear, the gear and cam member being journalled upon the shaft 30. A member 588 is pivoted to the gear at 590 and is urged counterclockwise as viewed in Figure 9 by a spring 593 to limited position which causes teeth 592 carried by member 588 to form a continuation of the teeth of the gear 586 to close partially the interruption 594. However, as will be evident from Figure 9, in the rest position of this gear 586 neither its teeth nor the teeth 592 mesh with the pinion 584.

The gear 586 carries a pin 596 which is arranged to be embraced by the notch 597 in a lever 598 pivoted to a fixed pin 600 and urged downwardly by a spring 602.

An arm 604 is carried by the shaft 30 and extends outwardly in a position to engage the pin 596 during its rotation.

At this point it will be convenient to describe the operation of an accumulator. As will appear more fully hereafter in the description of the overall operation of the machine, the plates 466 are rocked to a degree corresponding to the position of the corresponding projections on the slugs. With them are rocked the gear segments 482 and 486. As the shaft 36 rotates in unison with the shaft 30, each of these shafts rotating through a single revolution in each cycle of operation of the machine, the accumulator frame will be rocked clockwise as viewed in Figure 11 to produce meshing of the gear segments 486 with the corresponding gears 526. Following this meshing the plates 466 are restored to their original positions with the result that each will rock through an arc corresponding to its original forward movement, thereby imparting to the corresponding gears 526 movements which are of extents as hereafter described corresponding to the numerals printed by the corresponding plates 466. These movements of the gears 526 are clockwise as viewed in Figure 11. Through the pinions 526 they will advance the number wheels 530 to an extent corresponding to the values printed by the elements 476 in the corresponding orders. However, the action just described does not involve carrying and in accordance with the present invention a delayed carrying action is effected as will now be described.

In the event that any gear 526 is moved to an extent carrying the corresponding numbering wheel 530 through a change from 9 to 0, the corresponding projection 546 which is synchronized with the numbering wheel will rock the lever 548 counterclockwise to release the end 554 of the lever from the step 556. This action will result in rocking in a counterclockwise direction of the corresponding lever 558 under the action of the spring 568. The result is to retract the pawl nose 570 through a distance corresponding to one tooth of the gear 526 of the next higher order and to project the cam follower portion 562 of lever 558 into the path of the corresponding cam 574. In each accumulator these cams 574 are so arranged by virtue of both axial and angular displacement relative to each other that in the ultimate rotation of the cam member 572 the cams will act upon followers of successive orders at successive intervals, i. e., the cam corresponding to unit order will be the first to act, next the cam of the tens order and so on. The events which have so far been described, terminating with the rocking of the accumulator frame to its original position to disengage the gears 526 from the segments 586, occur during the earlier portion of the rotation of the shaft 30. There will now be described the operation which effects carrying between the orders as a succeeding operation.

Figure 9:
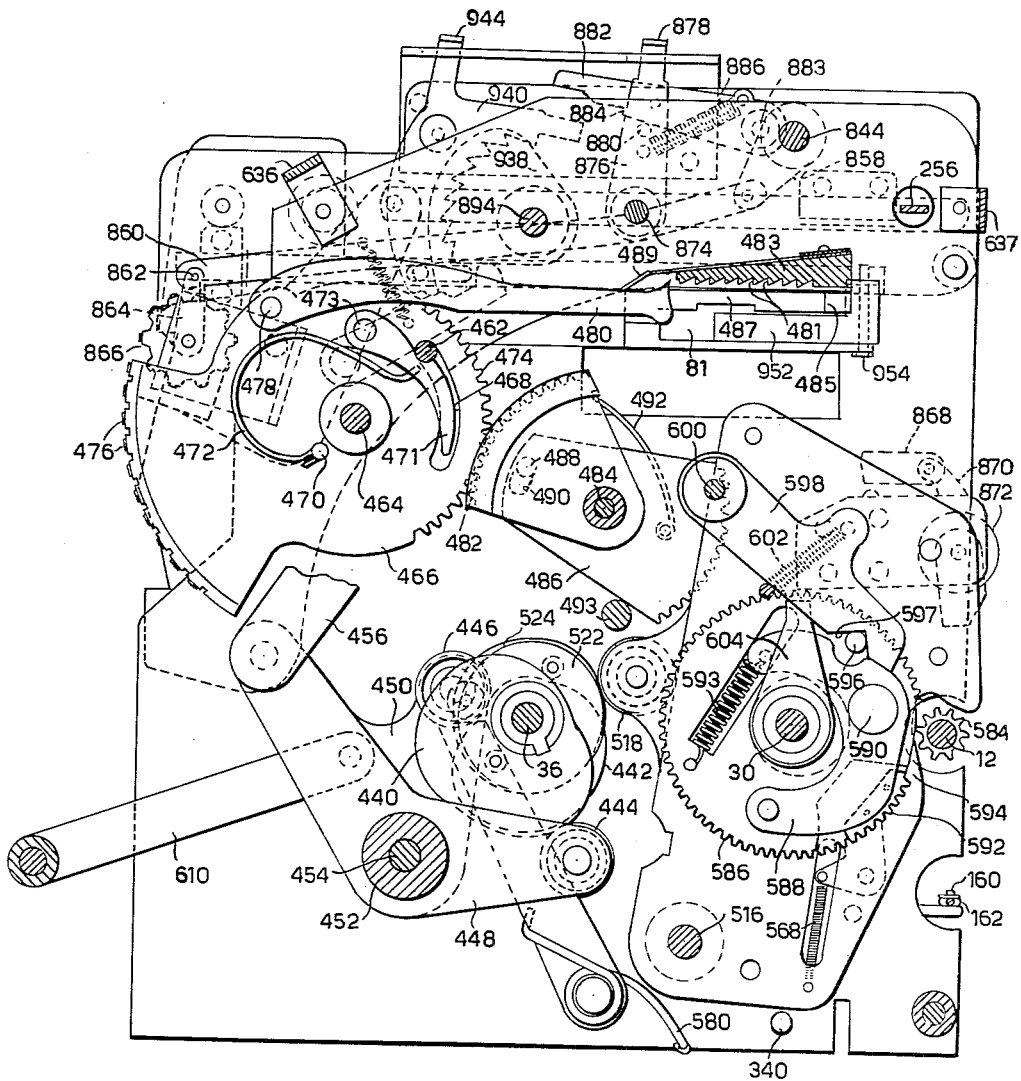
Figure 9 is a vertical section taken on the plane indicated at 9—9 in Figures 1B and 2B.

Referring now to Figure 9 the arm 604 carried by the shaft 30 occupies the position illustrated at the beginning of the cycle of rotation of this shaft. The rotation is counterclockwise as viewed in this figure. After the shaft rotates through about seven-eighths of its complete rotation the arm 604 will engage the pin 596 which is yieldingly held by the detent 598 and will start counterclockwise rotation of the gear 586. Before the arm 604 reaches its final position and the shaft 30 stops the yieldably mounted segment 592 will enter into mesh with the pinion 584 of the shaft 12 which continues to rotate. The purpose of having the segment 592 yielding is merely to provide non-clashing engagement of the gear with the pinion. Once mesh has been established the gear 586 will rotate through a complete revolution until the interruption of its teeth at 594 is again opposite the pinion 584 and the pin 596, after lifting the detent 598, has entered the notch 597. It will thus be evident that to the gear 586 and the cam member 572 there is imparted a rotation which begins slightly before the end of the rotation of the shaft 30 and continues for a complete revolution. Thus this cam member is operated after the original accumulating movements have been effected and after they have set up the levers 558 and pawls 556 which are to perform the carrying operation. Assuming for the sake of simplicity that the unit numbering wheel has moved beyond nine the cam corresponding to the unit order will engage the cam follower 562 and will rock the lever 558 to cause the pawl 566 to advance the wheel of the next order through one additional step. If this additional step causes a change from nine to zero in the tens order the lever 558 of this order will be released and rocked, placing its pawl 556 in position to impart a movement in the hundreds order. As has been point out, the actions of the cams 574 are successive in the successive orders so that when the tens cam reaches the cam follower 562 of that order carrying will be properly effected to the hundreds order. It will also be evident that this carrying operation does not in any way conflict with the possibility that any of the higher orders may have already been set to provide carrying to the next higher order, since the carrying takes place in succession in the orders beginning from the lowest to the highest. The delayed carrying action is thus effected in a positive and simple fashion without any interference due to the simultaneous actuation of the various orders originally by the segments 486.

It may be here remarked that the mechanism is such as contrasted with prior accumulators that the width of an accumulator may be maintained extremely small so that printed totals will have their various digits quite close together. The various elements of each accumulator are stacked close together with the provision of flat spacers where required to keep the elements in alignment. It will be evident that accumulators of the type described are of utility in devices other than the present ticket issuing machines and, accordingly, the accumulator features are not to be construed as limited to this machine.

The reason for the slot 490 may now be mentioned. A position of a plate 466 slightly counterclockwise of the rest position illustrated in Figure 11 corresponds to arrest by the presence of a pip in the extreme right hand position on a slug as viewed in that figure. In that position no printing of a record strip will occur by the plate; i. e., that position corresponds to an unprinted zero, for example preceding the significant figures of an amount. The next pip position arrests a plate 466 in the next succeeding counterclockwise position in which a zero is printed, the uppermost type face 476 being "0." But it will be evident that the corresponding accumulator gear 526 should not be advanced for either of such first two positions of a plate 466. The slot 490 takes care of this: lost motion is provided so that a segment 486 is not raised from pin 493 for the first or second steps of a plate 466, the segment 486 moving one tooth for a three step movement of its plate 466, etc., adding to the accumulator the digit which is printed on the record strip.

Retrograde movement of the shaft 36 is prevented by a detect lever 576 engaging the roller 336 carried by the cam 440. The lever 576 is pivoted at 578 and urged counterclockwise as viewed in Figures 10 and 11 by a spring 580.

In order to provide for printing by the characters 476 on the plates 466 there is provided a hammer and strip feeding mechanism which is disclosed primarily in Figures 1C, 3, 4 and 11. A rocking frame 604 is pivoted to the machine frame at 606 and connected to its lower end at 608 is a link 610 pivoted at 612 to the lever 448 so that the frame 604 is rocked with the rocking of the last mentioned lever. A pair of arms 614 and 616 support a hammer 618, the arms and the hammer being urged in a counterclockwise direction by a spring 617 secured between the lower end of the arm 616 and the frame 604. The arms are pivoted on a pin indicated at 620. A pin 619 projecting laterally from the arm 616 is arranged for cooperation with a shoulder 621 on a lever 622 pivoted at 623 on the frame and urged counterclockwise as viewed in Figure 4 by a spring 624. During the operation of the machine the forward end of lever 622 is acted upon by a pin 626 carried by the gear 34. A leaf spring 628 forms a cushion limiting the counterclockwise rotation of the hammer frame by engagement by the pin 619.

A guide 630 is provided for a strip of carbon paper while a guide 632 is provided for a record strip. The two of these pass together behind the transverse rod 634 from which the carbon paper passes upwardly and forwardly over guides 636 and 637 to the total printing mechanism hereafter described. The record strip passes upwardly about a roller 638 provided with pins engaging holes in the record strip and thence downwardly at the rear of the machine. The record sheet is retained on the roller 638 by a member 640 pivoted at 642 to the frame 604 and urged downwardly by a spring 643. The member 640 may be raised when desired for insertion of the record strip. The shaft of the roller 638 carries a ratchet 646 which is restrained against reverse movement by a detent 648 acted upon by a spring 650. A pawl 652 provided with an active shoulder 654 is pivoted to the fixed frame at 656 and is urged upwardly by a spring 658 to engage the racket 646. The shaft of the roller 638 is provided with a knurled extension 639 through which the roller may be manually forwardly advanced if it is desired to remove a portion of the record strip. A link 660 is pivoted to the frame 604 for a purpose hereafter described.

The operation of the hammer unit may be now briefly described. During the operation of the machine the frame 604 is moved counterclockwise as viewed in Figures 4 and 11 through the link 610. As this movement takes place the pin 619 is arrested by the shoulder 621 of the lever 622 with the result that the hammer 618 is restrained, having a relative clockwise movement with respect to the frame 604. This tensions the strong spring 617. At the same time, the shoulder 654 of the pawl 652 is positioned to the right of the lowermost tooth of the ratchet 646. While the frame is in its counterclockwise position the pin 626 engages the forward end of the lever 622, rocking it clockwise to release the pin 619 whereupon the spring 617 snaps the hammer against the record strip pressing it against the carbon paper strip and the type to make an impression. The rapid action thus imparted to the hammer causes the pin 619 to flex the leaf spring 628 to make the impression; but immediately thereafter the leaf spring moves the pin 619 slightly to the right with restoration of the hammer to the position illustrated in Figure 4, thereby releasing pressure of the hammer on the strip and type. In this fashion a single sharp blow is imparted with immediate release. As the operation of the machine continues the frame 604 rocks clockwise and in doing so rotation is imparted to the ratchet 646 and roller 638 by the pawl 652 to advance the record strip. The carbon strip take-up will be hereafter described.

Figure 11:
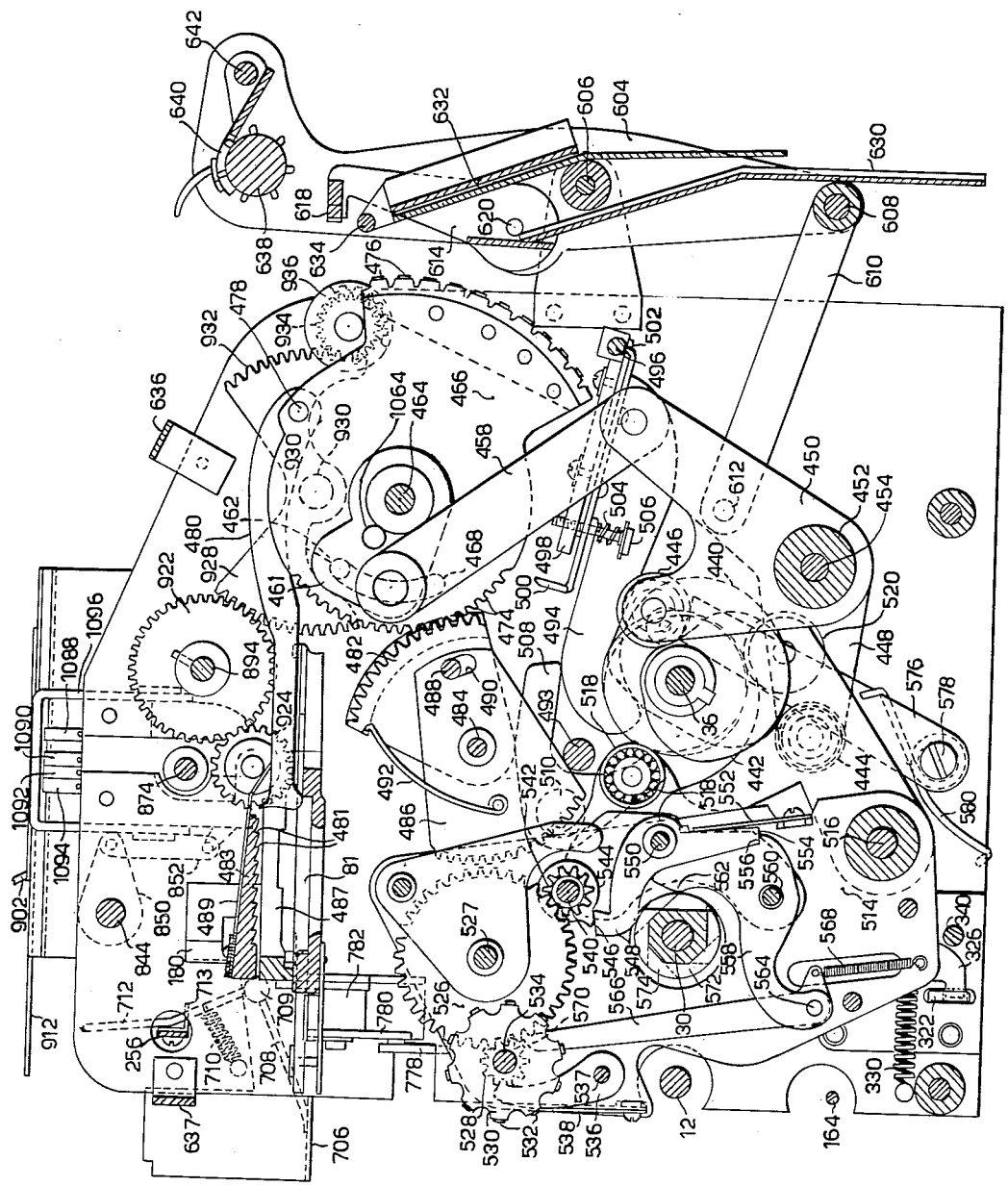
Figure 11 is a vertical section taken on the broken surface indicated at 11—11 in Figure 1B.
Figure 27:
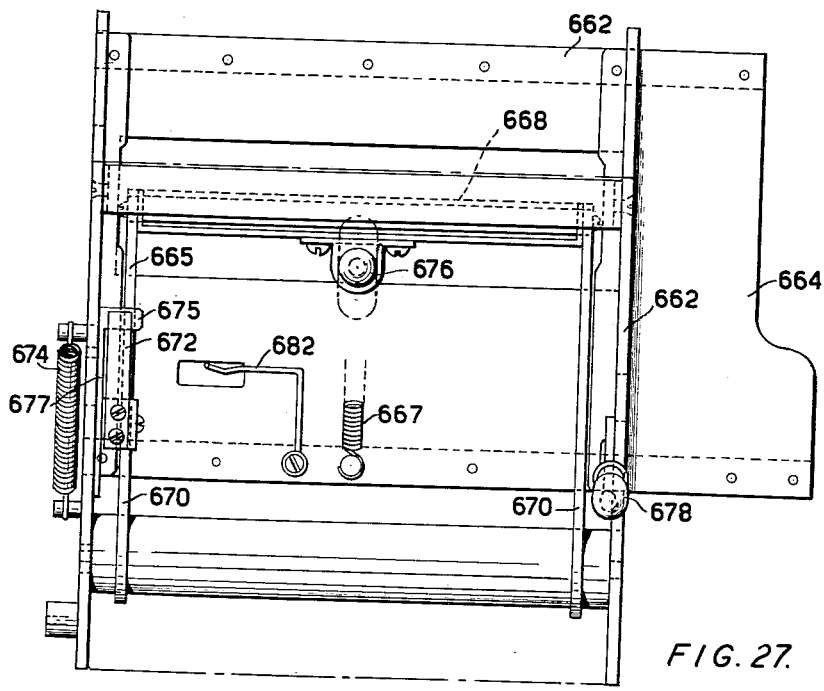
Figure 27 is an elevation of the means for handling a card for the printing of totals thereon.

The totalizing mechanism illustrated particularly in Figure 11 is used to print cards through the medium of the devices illustrated in Figures 27 and 28. A frame 662 adapted to be secured to the machine frame provides a mounting for vertical movement of a guide 664 for a card, the guide providing an opening 666 into which the card may be inserted from the right of Figure 27. A spring 667 urges this guide to an upper position and the guide may be moved downwardly by lifting the forward end of a lever 678 pivoted at 680 to the frame 662 and having its inner end engaged in a notch in the card guide 664. A hammer 668 is carried by arms 670 supported by a hub which is mounted on a horizontal pin 671. A plate 677 pivoted at 669 to the frame is urged in a counterclockwise direction as viewed in Figure 28 by a strong spring 674, the movement being limited by engagement of a pin 665 in the left-hand end of a slot in the left-hand plate of the frame 662. At its upper end the lever 677 has a turned end 675 which is gripped between a pair of leaf springs 672 and 673 carried by the left-hand arm 670 of the hammer. In rest position the parts are as illustrated in Figure 28 with the hammer held slightly spaced from a card inserted in the guideway 666, this position being secured by the action of the leaf springs 672 and 673 embracing the turned end 675 of the lever 677 which, as stated, has a definitely limited position. Printing is effected by pulling the hammer outwardly through the knob 676 connected thereto and then releasing this knob. The outward movement tensions the spring 674 so that when release occurs the hammer is pulled sharply inwardly by this spring. The inertia of the hammer causes it to overrun its normal position by flexing of the spring 672 so that a sharp blow is imparted to the card forcing it against the carbon paper which is fed downwardly past the position of the card and the type numbers 532 on the accumulator discs, the carbon paper passing downwardly from the support strip 637.

By manipulation of the lever 678, opening and closing entries may be made on a totalizer card which is hereafter described. The card is yieldingly held in position for the printing by a spring 682.

A bevel pinion 684 carried by the shaft 373 drives through a cooperating bevel pinion 686 a shaft 688 which carries a gear 690 provided with a Geneva driver in the form of a pin 692 and an arcuate retainer 694 of conventional type cooperating with the Geneva driven element 696. This latter is carried by a pinwheel 698 which is pivoted on a fixed pin in the frame and is provided with pins 700 for engagement with openings in a ticket strip. The ticket strip is guided to the pins by a guide indicated at 702. Printing of the ticket strip by the plates carried by the slugs and by other type not yet described is effected by the action of a platen 704 and the printed tickets are delivered to a table 706 where they are adapted to be held by a finger 708, carried by a rocker shaft 709, pivoted in the frame and provided with an upstanding arm 712 which may be manually manipulated but which is also acted upon during the operation of the machine by a cam 713 carried by the link 256 previously described. A spring 710 serves to urge the finger 708 toward ticket clamping position.

The platen 704 is supported by a movable carrier 714, the platen being adjustable on this carrier through the medium of nuts 728 surrounding screws extending from the platen, there being provided strong springs 730 to insure the holding of a fixed adjustment. The carrier 714 is pivoted at 716 and 717 to the ends of links 718 and 719 which are, in turn, pivoted at 720 and 721 to the frame. An accurate parallel type of movement of the carrier and platen is thus assured. Upward movements are imparted to the platen carrier by a cam 724 acting on rollers 722 mounted on the carrier, the cam 724 being secured to a gear 726 meshing with the gear 690. A gear 732 meshes with the gear 726 and carries a pin 733 arranged to act on an arm 735 carried by link 719 for the purpose of insuring downward movements of the platen carrier.

The gear 732 also carries pins 734 and 736 which act upon the arms of a bifurcated lever 738 pivoted on a fixed pin 740 and provided with an arm 742 pivoted at 746 to a knife actuator 748. A spring 744 acts between the arm 742 and the actuator 748 to hold the latter against the outside of the knife carrier 752. A shoulder portion 750 of the actuator 748 extending through a slot in the knife carrier is in position to operate against the upper end of the slot 751 therein. A knife 754 is supported by the carrier which is guided for vertical movement in the frame. This knife cooperates with a fixed knife 756 located above the path of movement of the ticket strip, the movable knife 754 being provided with an ear 758 which, by riding over the movable knife, causes the cutting edges to be properly relatively positioned for shearing of the ticket strip.

Figure 2A:
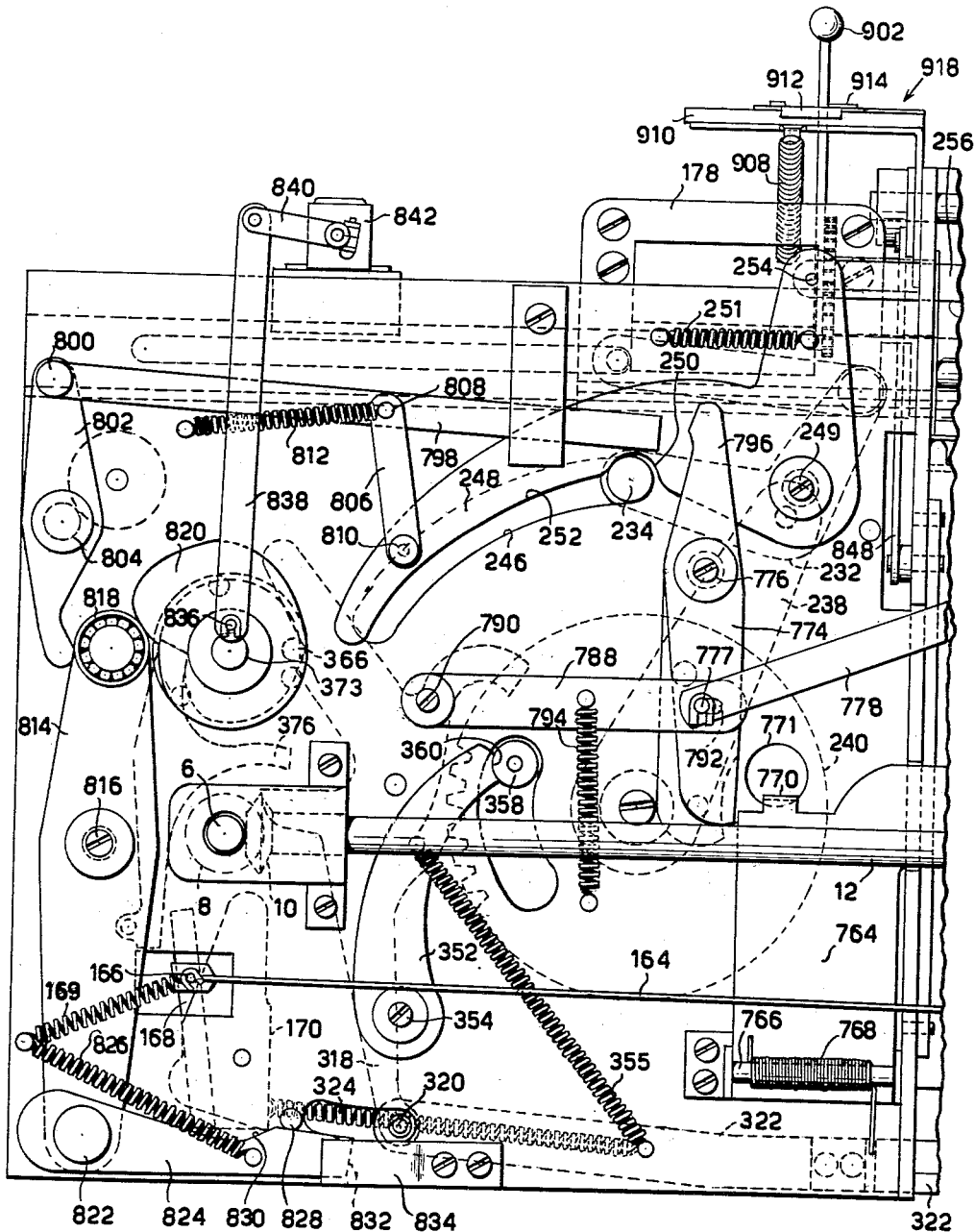
Figure 2A is a front elevation of the left-hand portion of the machine.

The actuator 748 is provided with a laterally extending pin 760 behind which there projects the end 762 of a plate 764 pivoted to rock on a pin 766 and normally urged inwardly as viewed in Figure 2A by a spring 768. The upper end of the plate 764 is provided with an inwardly turned ear 770 extending, when the machine is in rest position, into an opening 772 in the disc 240, the ear 770 extending through an opening 771 in the front plate of the machine for this purpose.

A lever 774 pivoted to the frame at 776 has its lower end adapted during the operation of the machine, under certain conditions, to extend behind the plate 764 to prevent cutting. Pivoted to lever 774 at 777 is a link 778 which is pivoted to the arm 780 depending from a hub 782 journalled on a pin 783 and carrying an upwardly extending arm 784 having an inwardly turned portion 786 adapted to be engaged by the shoulder 120' of a slug when the slug is in its innermost position. Under these same conditions, if the slug is provided with the shoulder 120, the turned portion 786 will not be engaged. A lever 788 pivoted at 790 to the frame has a slot 792 embracing the pin 777 and this lever 788 is urged downwardly by a spring 794 to impart friction to the lever 774, link 778 and connected parts to prevent accidental displacement of these parts during the operation. As will be clear hereafter, these parts are positioned during the beginning of a complete cycle but have their effective functions delayed until near the end of the cycle.

The upper end 796 of the lever 774 is arranged to be engaged at proper times by the end of a link 798 which is pivoted at 800 to a lever 802 pivoted to the frame at 804. Pivoted to this link 798 at 808 is a link 806 which is also pivoted to the lever 248 at 810. A spring 812 urges the link 798 toward the left as viewed in Figure 2A. The lower end of the lever 802 is arranged to be engaged by the upper end of a lever 814 pivoted at 816 and provided with a roller 818 acted upon by a cam 820 carried by the end of the shaft 373. To the lower end of lever 814 there is pivoted at 822 a link 824 which is urged upwardly by a spring 826 into contact with a fixed pin 828. The spring 826 also serves to maintain the roller 818 in contact with the cam 820. The upper edge of the link 824 is provided with a clearance indicated at 830 so that if the pin 320 carried by the lower end of the lever 318 is in a right-hand position the right-hand end 832 of the link 824 may rise and abut it as the link 824 moves to the right. On the other hand, if the pin 320 is in a left-hand position the link 824 will merely rise against the lower surface of this pin 320 riding thereunder without imparting any right-hand force thereto. A bracket 834 serves to guide the link 824 to prevent its outward movement.

The end of the shaft 373 carries a crank pin 836 which, through a link 838, serves to operate the arm 840 of a counter 842 which counts the individual coupons issued by the machine since, as will be apparent hereafter, the shaft 372 makes a number of revolutions corresponding to the number of coupons issued in each cycle.

It may be here noted that counter 842 is typical of other counters which may be supplied if desired to be actuated by various of the plates 466 to count, for example, round trip tickets in distinction from one way tickets or pullman tickets in distinction from coach tickets, or the like. The application of such counters to the machine will be obvious, these being operated by extensive movements of the various plates 466 as contrasted with short movements thereof.

A shaft 844 extends across the top of the machine and carries a lever 846 which is connected through a link 848 to the sliding knife support 752 so that the shaft 844 is rocked upon each operation of the knife. This shaft is connected to drive a series of printing counters adapted to print the serial number of each complete ticket issued. A lever 850 carried by the shaft 844 is connected by a link 852 to the operating arm 854 of a printing counter or head 856 adapted to print serial numbers on the issued coupons of a ticket. The shaft 844 also carries an arm 858 which is connected through a link 860 at 862 to the operating arm 864, of another numbering head 866, adapted to print the serial number of each ticket issued on the record strip. To the pivot 862 there is connected another link 868 which is pivoted to the actuating arm 870 of a third numbering head 872 which is adapted to print the serial number of a ticket on a totalizer card. The two numbering heads or counters 856 and 864 are set originally so as to print the same serial number, while the head 872 may be set to print a serial number one less than that just stated. As will be evident hereafter, this furnishes a checking system which is very desirable.

While, at the present time, the majority of tickets which are issued involve the payment of a tax, there are certain tickets which are tax exempt and it is desirable to indicate the issue of tax exempt tickets on the record strip. To achieve this end a shaft 874 is provided (Figures 12, 29 and 30) which carries an arm 876 having a tab on its upper end which may carry the word "Tax," this arm projecting through the upper cover plate of the machine. In the position illustrated in the figures just mentioned, the position is such as to effect the recording on the record strip of the issue of tickets for which tax has been paid. By rocking the arm 876 to the left, however, as viewed in Figure 12, the designation on the tab may be brought into coincidence with the word "Exempt" on top of the machine so that the recording will be that of tax exemption. The arm 876 carries a pin 880 which, on movement to the left in Figure 12, will be latched by a shoulder 884 of a lever 882 pivoted to the frame at 883 and urged downwardly by a spring 886 which also serves, by being anchored to the arm 876, to urge the shaft 874 in a clockwise direction as viewed in Figure 12. The shaft 874 carries an arm 888 provided with a pin 890 adapted to engage and rock a lever 892 which is journalled on a shaft 894, a spring 896 serving to hold the lever 892 in a clockwise position as viewed in Figure 30 to cause a nose 898 of this lever to be positioned for engagement by a shoulder 900 on a link 480' of the series 480 previously referred to. As will be noted in Figure 7 the plate 466 to which the link 480' is connected carries, in a position corresponding to the nines of associated plates, the designation "X" which may be taken to mean "tax exemption." If the shaft 874 is in the position illustrated in the figures corresponding to payment of tax the nose 898 will arrest the link 480', preventing movement of the plate to which it is pivoted. Accordingly, the tax exempt designation will not be printed on the record strip, the corresponding plate 466 being blank in all positions except its last one. On the other hand, if the ticket issued is tax exempt the shaft 874 is rocked to its alternative position with the result that the lever 892 will be lifted to clear the shoulder 900 and a full stroke of the link 480' will occur causing a printing of the "X." It may be here remarked that the slugs will, in general, not carry any pip or projection in line with the movement of this link 480'.

Figure 1B:
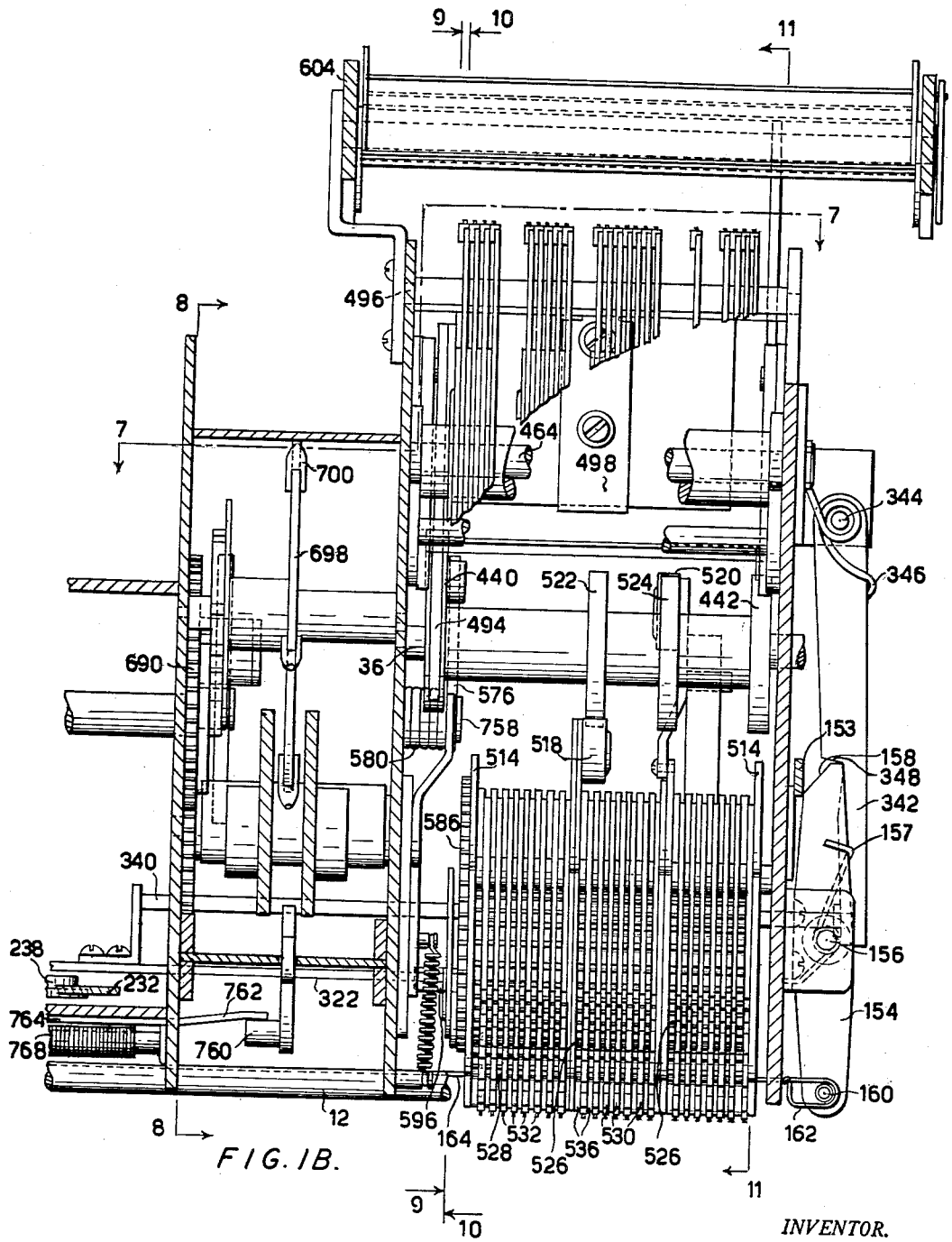
Figure 1B is a similar horizontal section through the right-hand portion of the machine.

Referring now particularly to Figures 1A, 10, 11, 12, 13 and 29, a lever 902 is secured to a gear 904, the hub of which is journalled on a fixed pin 906. A spring 908 urges the lever 902 forwardly as viewed in Figure 29. A plate 910 at the top of the machine serves as a mount for a slide 912 which has an opening 914 therein through which the lever 902 projects. The slide 912 carries a pointing indicator 916 cooperating with a plate 918 on the support 910 which carries various code designations as indicated in Figure 1A. These code designations are adapted to be printed on the issued ticket coupons and also on the record strip. To attain this result the gear 904 meshes with a gear 920 on the shaft 894 previously referred to. The shaft carries a gear 922 which meshes with a pinion 924 connected to a code printing head indicated at 926 adapted to print the code designations on the ticket coupons. The gear 922 also meshes with teeth of a double segment 928 pivoted to the frame at 930, the teeth 932 of which are in mesh with a pinion 934 of a second code printing head 936 adapted to print on the record strip.

In order to hold the code printers in set positions the shaft 894 carries a ratchet segment 938 (Figure 12) with which cooperates a detent lever 940 pivoted to the frame at 942 and having an upward extension 944 projecting through the top plate of the machine for manual manipulation. The detent lever 940 is provided with a shoulder 946 adapted to engage and hold the teeth of the ratchet segment. The depending arm 948 of the lever 940 is provided with a pin 950 and terminates in a rounded nose.

The majority of tickets issued by a machine such as the present one represent cash fares and it is desirable that normally the code printing devices should be in a position to print an indication of such fares, for example, by printing the letters "CA." Accordingly, provision is made for automatically returning the code printing devices to this designation after they have been set to print some other code designation. However, this automatic resetting mechanism will only operate if a slug is removed from the machine; if a slug remains in the machine for the issue of a multiple number of tickets the code designation set for the first will continue to be printed on subsequent tickets of the group. The results just outlined are achieved by the use of the mechanism particularly illustrated in Figures 12 and 13.

A lever 952 is pivoted on a fixed pin 954 and its hub is provided with a shoulder 956 arranged to cooperate with the forward end of a link 958 guided for longitudinal movement in the frame and provided with an elongated slot 960 embracing the pin 950. A leaf spring 962 urges the forward end of the link 958 against the hub of the lever 952. A bell crank 964 pivoted on a fixed pin 966 is urged clockwise as viewed in Figure 12 by a spring 968 to bring its upper end 970 into engagement with a stop pin 976. The upper end 970 of the bell crank is located between pins 972 and 974 carried by the link 958. A lever 978 pivoted to the frame at 980 is urged upwardly by a spring 982. It is provided with a notch 984 and with a rounded end 986.

Figure 12:
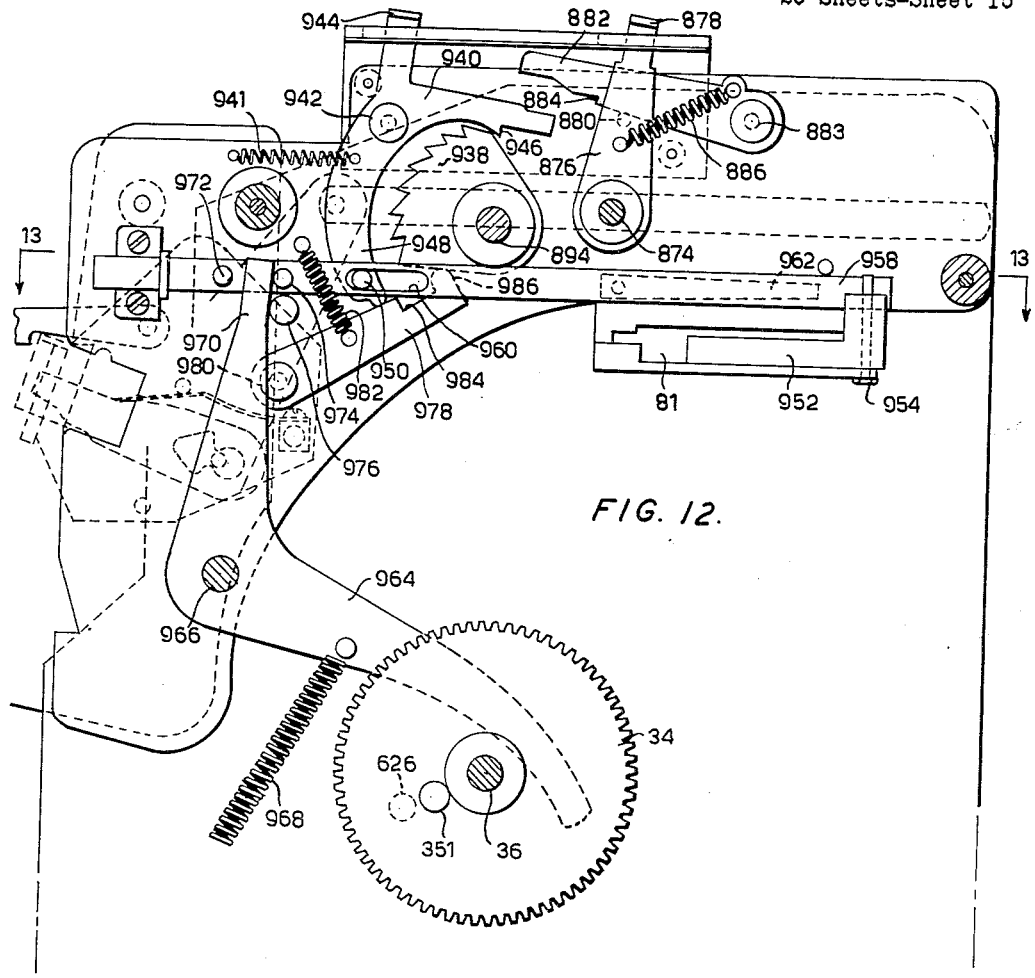
Figure 12 is a fragmentary view showing certain elements involved in the printing of code designations, the view being in the form of a section taken on the plane indicated at 12—12 in Figure 1C.
Figure 13:
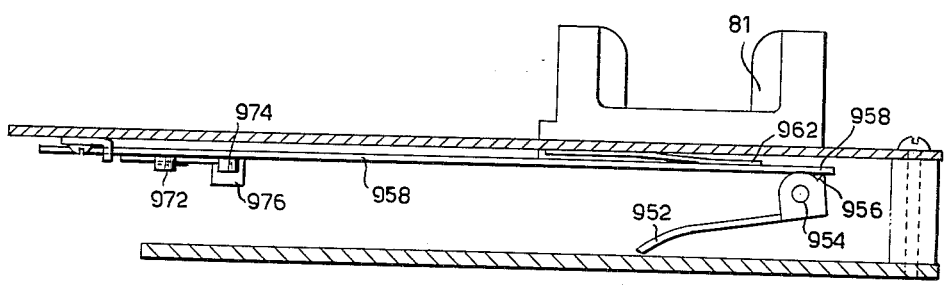
Figure 13 is a fragmentary view showing certain of the elements illustrated in Figure 12, this view being in the form of a horizontal section taken on the plane indicated at 13—13 in Figure 12.

The normal rest pisition of the parts in the absence of a slug is illustrated in Figures 12 and 13. Under these conditions, if the shaft 894 is rocked clockwise by manipulation of the lever 902 the detent 940, by cooperation with the ratchet segment 938 and under the action of spring 941, will retain the shaft 894 in any set position. If the operator of the machine has made an error in setting this may be rectified by moving the lever 940 counterclockwise to lift it from action on the ratchet segment 938 whereupon the spring 908 will restore the code printing devices to the cash fare position. This rocking of the lever 940 will also cause its end to engage the latch lever 882 so as to restore the lever 876 to the tax position. A full restoration of the shaft 894 to the cash fare position is insured by the action of the lever 978 as follows: as the lever 940 is rocked counterclockwise its rounded lower nose will move into the notch 984 of lever 978 and will be there retained, since the lever 978 is free to move upwardly under the action of spring 982 when the ratchet segment 938 is in other than cash position. Accordingly, free movement of the ratchet segment is insured without engagement of any if its teeth by the shoulder 946. However, when it reaches cash fare position the lower edge of the ratchet section will engage the rounded nose 986 of lever 978 moving it downwardly and releasing the lever 940 to move to its normal position illustrated under the action of spring 941.

When a slug is inserted in the machine its advancing end will rock the lever 952 counterclockwise as viewed in Figure 13. It will be noted that this lever is close to the entrance of the slug guideway and hence so long as the slug is inserted only to a slight degree this lever will be in counterclockwise position. As the slug is placed in the machine and the lever 952 rocks its shoulder 956 will merely ride on the surface of the link 958 flexing it against the pressure of the spring 962. Either before or after this the lever 902 may be set to print other than a cash fare designation. Assuming now that it is so set and that the slug remains in the machine the following sequence of operations will occur. As the shaft 36 rotates, as will be hereafter more fully described, the pin 626 will engage the bell crank 964 rocking it counterclockwise and, by engagement of its upper end 970 with the pin 972, it will effect the movement of the link 958 rearwardly causing its forward end to pass beyond the shoulder 956. Thereafter, when the bell crank 964 is released by the pin 626 the link 958 will be arrested in its forward movement, which occurs by the action of the upper end 970 of the bell crank on the pin 974, by the shoulder 956. So long as the slug is in the machine sufficiently far to maintain the position of lever 952 this condition will be maintained, the link 958 not achieving any position causing the rear end of the slot 960 therein to engage the pin 950.

However, if the slug is removed from the machine the strong spring 968 will snap the link 958 forwardly, rocking the lever 952 to the position illustrated in Figure 13 and, at the same time, link 958 by inertia will overrun its rest position to trip the lever 940 away from the ratchet segment 930. As in the case of manual operation the lever 940 will be retained temporarily by the action of the notch 984 in ratchet-releasing position so that return of the ratchet to cash fare position will be assured, the lever 940 being released from the notch 984 by the action of the lower end of the ratchet on the lever 978 when the cash fare position is attained. The spring 941 may then restore the lever 940 to its normal position at the same time bringing the link 958 rearwardly by the action of the pin 950 in the rear end of the slot 960. Accordingly, complete removal of a slug will always restore the code printing devices to normal position whereas if the slug is retained in the guideway for the issue of a series of similar tickets the restoration will not occur and the code designation which is set will be reseated on subsequent tickets of a group which are caused to be printed by reinserting the slug to the proper extent in the mechanism.

Figure 20:
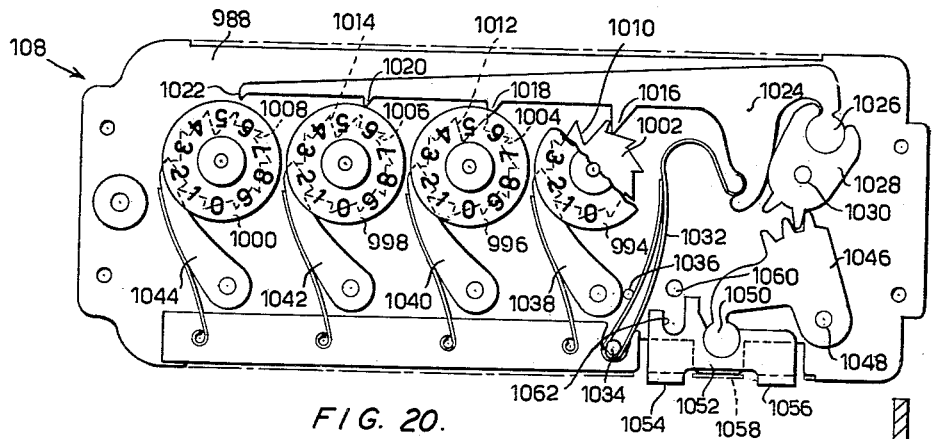
Figure 20 is a plan view showing the construction of a slug counter with the top cover plate removed.

There will now be described the construction and operation of the counters carried by the slugs which have been heretofore generally referred to as 108. Referring particularly to Figures 17 and 20, a counter of this type has its mechanism located between a bottom plate 988 and a top plate 990 which are riveted together and secured to the carrying slug by screw 112. The top plate 990 is provided with openings 992 to disclose the numerals carried by the discs 994, 996, 998 and 1000 indicating the respective orders of the counter. These discs are mounted on fixed pins on the bottom plate 988 and are secured to ratchets 1002, 1004, 1006 and 1008 which are provided with shallow teeth with the exception of one deep tooth in each as indicated at 1010, 1012 and 1014. The ratchet 1008 may be identical with the others but, as will be evident, the deep tooth therein has no function, this ratchet corresponding to the highest order from which no carrying occurs. Pawl teeth of graduated lengths as indicated at 1016, 1018, 1020 and 1022 are carried by a link 1024 which has a cylindrical end fitting in a corresponding socket of a lever 1028 pivoted at 1030 on the plate 988. A spring 1032 which surrounds a pin 1034 and engages a pin 1036 serves the dual purpose, by seating in a socket in the link 1024, of urging this link toward the right in Figure 20 and also counterclockwise. A series of detents 1038, 1040, 1042 and 1044 are provided to prevent reverse rotation of the number discs by engagement with the ratchets, these detents being controlled by suitable springs.

A segment 1046 pivoted at 1048 to the plate 988 is provided with teeth engageable with teeth on the lever 1028. The segment 1046 is provided with a cylindrical end portion 1050 located in a socket in a member 1052 which is provided with a pair of outwardly directed extensions 1054 and 1056 projecting through openings in the depending flange 1058 of the cover plate 990. A pin 1060 carried by the plate 988 is arranged to be embraced by a slot 1062 in the member 1052.

Before proceeding to describe the mechanism of the machine which operates this counter its general operation may be described.

If effort is applied to either the projection 1056 or 1054 or to both so as to cause a rocking of the member 1052 about the pivot constituted at 1050 it will be evident that the member will be shifted so that the slot 1062 will be out of alignment with the pin 1060 and hence the segment 1046 will not be rocked, the pin 1060 serving as a stop to prevent more than limited inward movement of the member 1052. On the other hand, if the extensions 1054 and 1056 are moved together so as to maintain member 1052 parallel to itself as it moves inwardly, the slot 1062 will embrace the pin 1060 and rocking of the segment 1046 in clockwise direction will be effected. The purpose of the pin and slot arrangement is to minimize accidental operation of the counter or even casual manual operation such as might be occasioned by careless handling of the slug.

While manual operation of the counter may be effected by careful simultaneous pressure on the extensions 1054 and 1056, it will be evident that it is relatively difficult to accomplish such operation and it would be very improbably accomplished accidentally.

When the segment 1046 is rocked clockwise the lever 1028 will be rocked counterclockwise and the link 1024 will be moved to the left to advance the ratchet 1002 one step by engagement of the pawl tooth 1016 with a ratchet tooth. Assuming that in this operation a shallow tooth of the ratchet 1002 is engaged the link 1024 is held sufficiently high to cause the pawl teeth 1018, 1020 and 1022 to miss entirely the ratchets 1004, 1006 and 1008. The action just mentioned would be characteristic of the shift of the ratchet 1002 through any step except that corresponding to a change from 9 to 0 appearing through the corresponding opening 992.

When, however, the 9 on the disc 994 is exposed through the opening 992 the deep tooth 1010 is in position to be engaged by the pawl tooth 1016. The presence of this deep tooth permits the link 1024 to occupy a position further counterclockwise than that illustrated so that the pawl tooth 1018 will be in a position to engage a tooth of the ratchet 1004 though the teeth 1020 and 1022 will still be positioned sufficiently outwardly to clear the ratchets 1006 and 1008, provided the disc 996 is not in a position exposing its 9. The next operation of the counter will accordingly cause a transition of the disc 994 from an indication of 9 to an indication of 0 while, at the same time, the disc 996 will be advanced one step to add a unit in the tens order.

If both the discs 994 and 996 of the units and tens orders are in position exposing nines then the deep teeth 1010 and 1012 will permit still further counterclockwise movement of the link 1024 with the result that the pawl tooth 1020 will be sufficiently inwardly positioned to engage a tooth of the ratchet 1006 of the hundreds order. Accordingly, the next movement will move both discs 994 and 996 to expose zeros while the disc 998 will be advanced one step. A similar type of operation will result in carrying a unit to the thousands disc 1000. It will be evident that this type of arrangement could be carried to still higher orders.

From the above operation it will be seen that there is provided an extremely compact counter arranged for the proper carrying of units to higher orders, which counter may be constructed, in view of the flat arrangement of the parts, of a thickness of the order of only one-eighth inch. The counter is accordingly well adapted to be supported by a slug without taking up any substantial amount of space and also without adding any objectionable weight to the slug.

The slug counters just described are adapted to be operated once in each complete cycle of the machine. For this purpose a pin 1064 is carried by the member 461 which is rocked once in each complete cycle. The pin 1064 is located in a slot 1066 in the periphery of a member 1068 pivoted on the shaft 464. This member 1068 is provided with an upstanding ear 1070 projecting through a slot in the end of a link 1072 to the end of which there is secured a spring 1074, the other end of which is looped about a pin 1076 projecting downwardly through a slot in the link 1072 from a lever 1078 pivoted to the frame at 1080 and having a pivotal connection with a slide 1082, guided by fixed stud 1084, which slide is provided with a pair of projections 1086 arranged to align with and press inwardly the extensions 1054 and 1056 of the member 1052 of a slug counter. This arrangement is such that a properly controlled movement of the member 1052 is secured to cause the slot 1034 to embrace the pin 1060 thereby effecting proper advance of the counter.

In addition to the various printing elements which have so far been described there are in the machine a number of slugs adapted to print on the ticket coupons and on the record tape. A slug 1088 is desirably provided to print on each coupon the designation of the machine from which the coupon was issued. Associated with this are slugs 1090, 1092 and 1094 respectively adapted to print on the coupons the month, day and year. These slugs are held under a yoke 1096 and may be changed from day to day as desired.

Figure 2B:
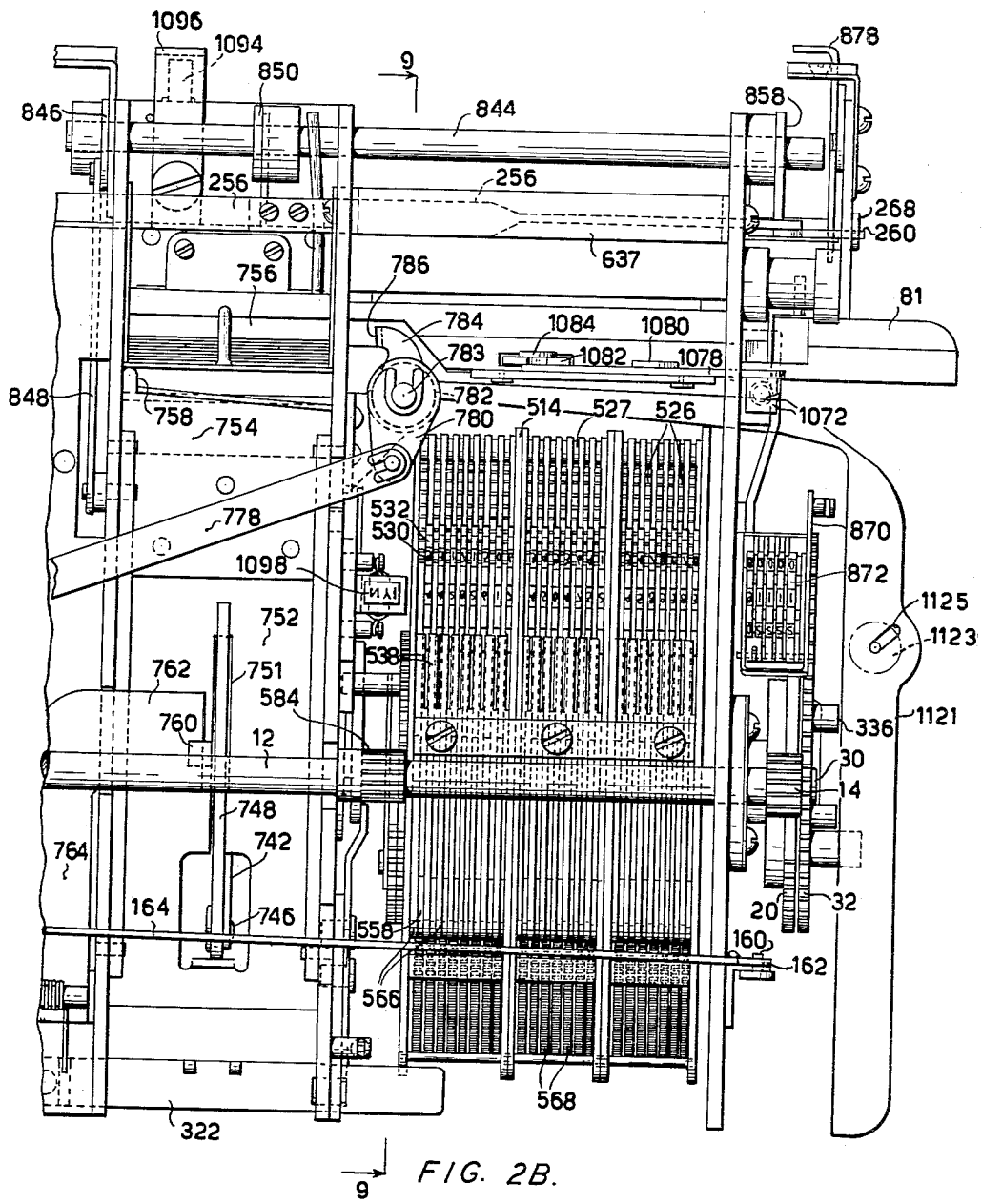
Figure 2B is a front elevation of the right-hand portion of the machine.
Figure 3:
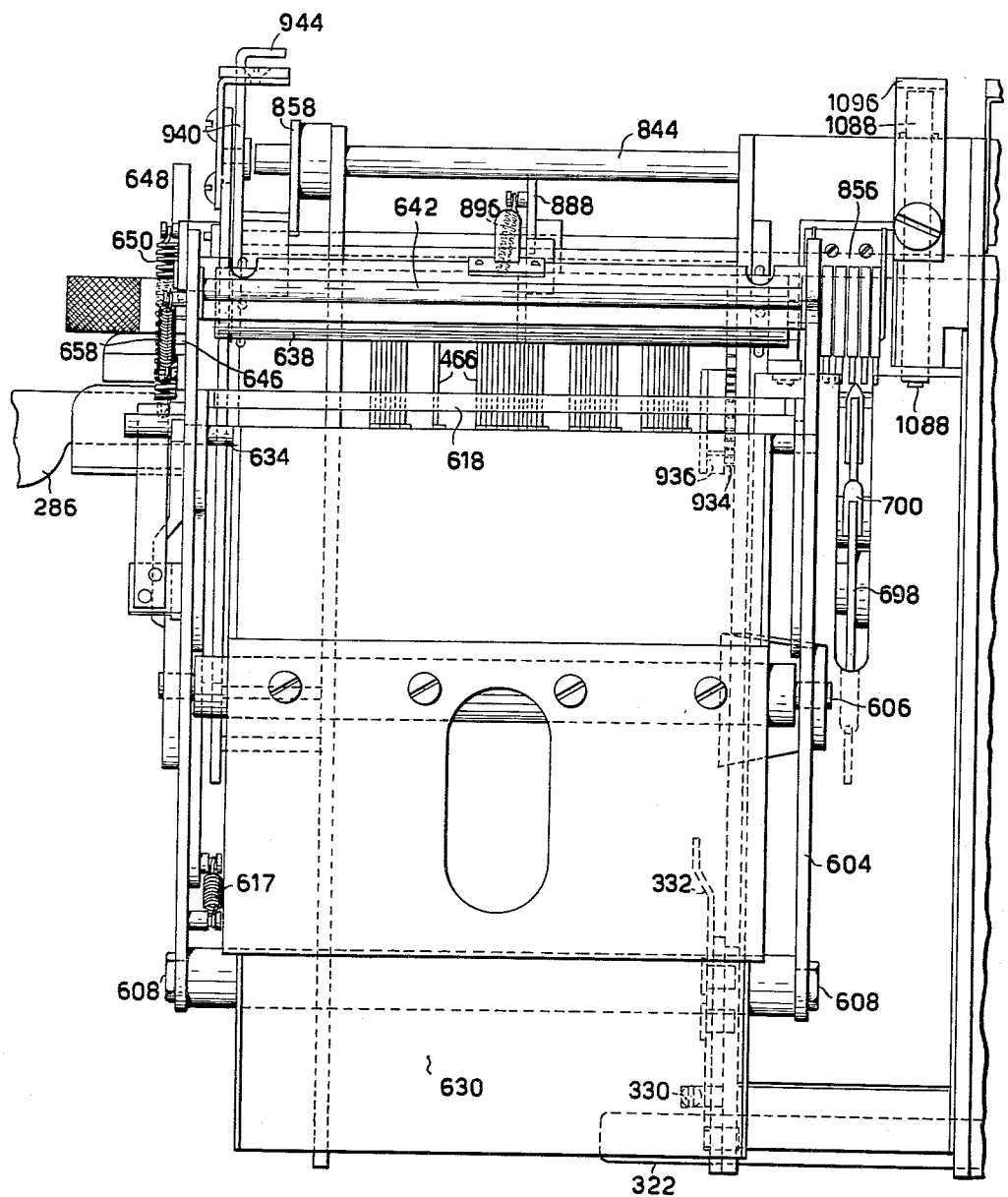
Figure 3 is a back elevation of the right-hand portion of the machine.

A fixed slug 1098 may be provided as indicated in Figure 2B to print the machine designation on a totalizer.

As will be mentioned hereafter, it is desirable to print on a record strip simultaneously with the printing of a ticket coupon a record of what is printed on the ticket and for this purpose a sheet of paper backed with carbon is fed from the right-hand side of the machine toward the left along with a strip of carbon paper past the station where the ticket coupons are printed. The two strips just mentioned are fed into the machine in superimposed relationship through a guideway indicated at 1121 provided with a roller 1123, the trunnions of which are carried in sloping slots 1125 in the side of the guideway, this roller serving to prevent retrograde movement of the record and carbon strips. The record strip must be given a substantial advance after each printing operation to clear the printed area from the printing devices and present a clean portion of the strip. The carbon strip, on the other hand, is given only a relatively slight advance for the purpose of conserving the supply. Accordingly, there are provided a high speed take-up for the record strip and a low speed take-up for the carbon strip.

Figure 21:
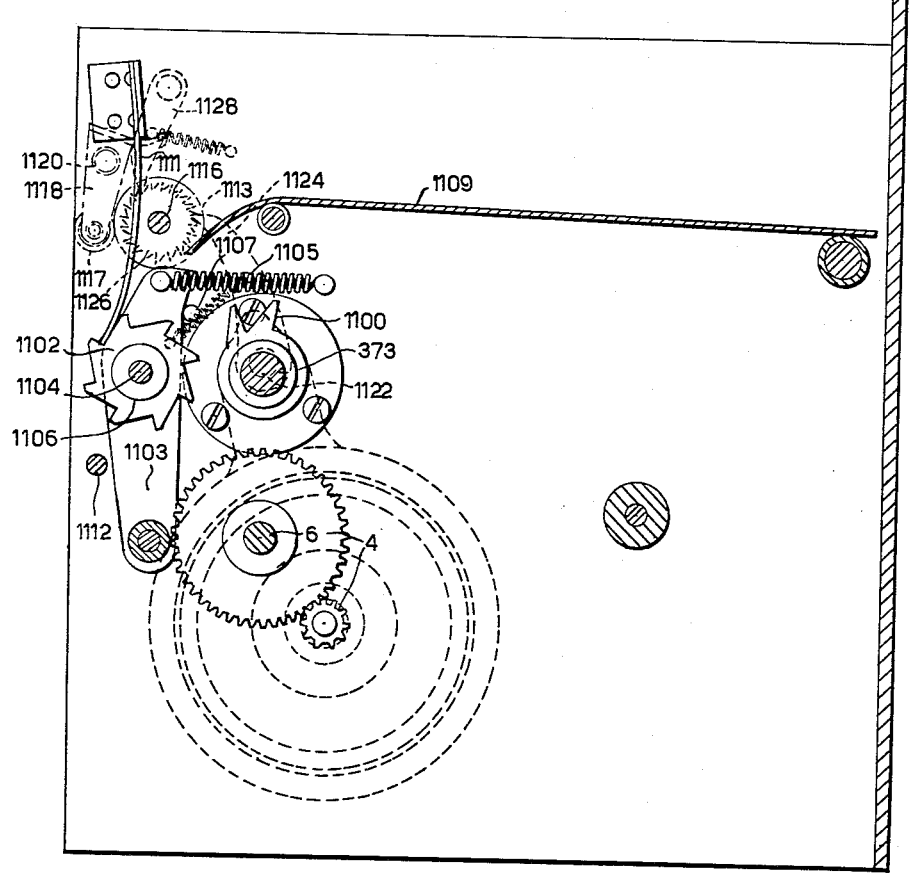
Figure 21 is a horizontal section taken on the plane indicated at 21—21 in Figure 1A.

A member 1100 provided with a pair of teeth is carried by the shaft 373 in such fashion that the teeth will engage and advance the teeth of a ratchet 1102 carried by a shaft 1104 which, in turn, carries a take-up roller 1106 over which the record strip passes. The shaft 1104 is mounted in a rocking frame 1103 which is pivoted in the frame and urged clockwise as viewed in Figure 21 by a spring 1105 into contact with a stop pin 1107. This arrangement is provided to permit the ratchet to yield as it is struck at high speed by the teeth of the member 1100. A spring detent 1111 prevents reverse movement of the ratchet. A knurled roller 1108 is arranged to press the record strip against the roller 1106, being mounted in a frame 1110 journalled on a fixed shaft 112 and urged toward its engaging position by springs 114 reacting between the frame 110 and the shaft. The record strip and carbon strip are fed across plate 1109 which prevents their becoming entangled in the underlying mechanism.

The low speed take-up for the carbon strip comprises a roller 1113 mounted on a shaft 1116, there being arranged to cooperate with the roller 1113 a knurled wheel 1117 mounted on a frame 1118 which is journalled on a fixed shaft and urged into clamping position by springs 1120. An eccentric pin 1122 on the shaft 373 drives a spring controlled pawl 1124 to advance a ratchet 1126 carried by the shaft 116, reverse rotation of the ratchet being prevented by a spring controlled pawl 1128.

Figure 25:
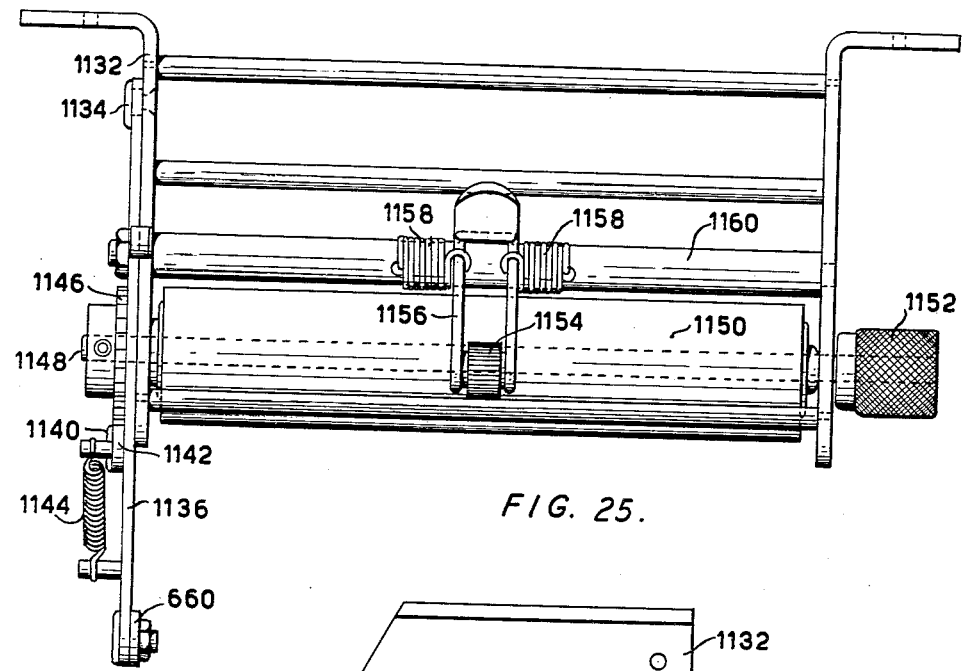
Figure 25 is an elevation of the take-up mechanism for a strip of carbon paper looking in the direction of the arrow 25 in Figure 26.
Figure 26:
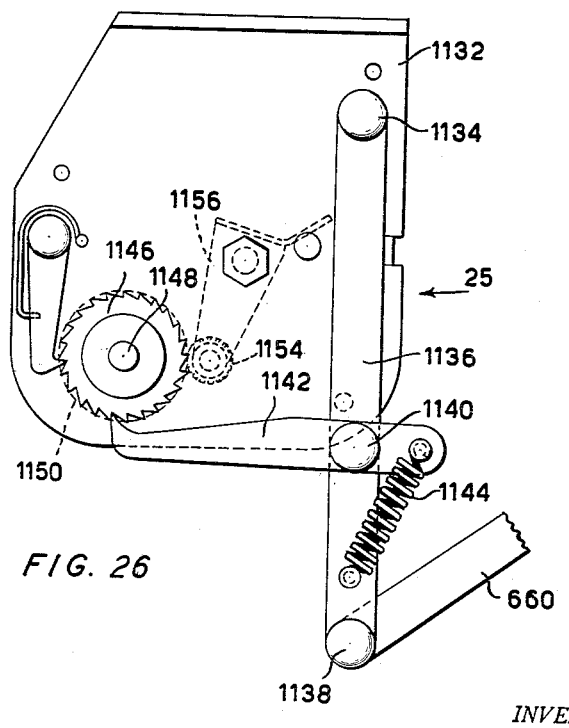
Figure 26 is an elevation looking at the left-hand end of Figure 25.

The take-up for the main record strip on which printing is effected by the action of the hammer 618 is illustrated in Figures 25 and 26. This is located in the lower portion of the housing separate from the unit which has been so far primarily described. A frame 1132 has pivoted to it at 1134 a lever 1136 to which is pivoted at 1138 the link 660 referred to above. Pivoted on the lever 1136 at 1140 is a pawl 1142 controlled by a spring 1144 and arranged to advance a ratchet 1146 carried by a shaft 1148 on which is secured the take-up roller 1150, the shaft 1148 being provided with a knurled knob 1152 through the medium of which the record strip may be manually advanced. A knurled roller 1154 is carried by a frame 1156 journalled on a fixed shaft 1160 and urged toward the roller 1150 by a pair of springs 1158 which are anchored in holes in the shaft 1160 and have their inner ends hooked around the frame 1156.

Figures 33, 34:
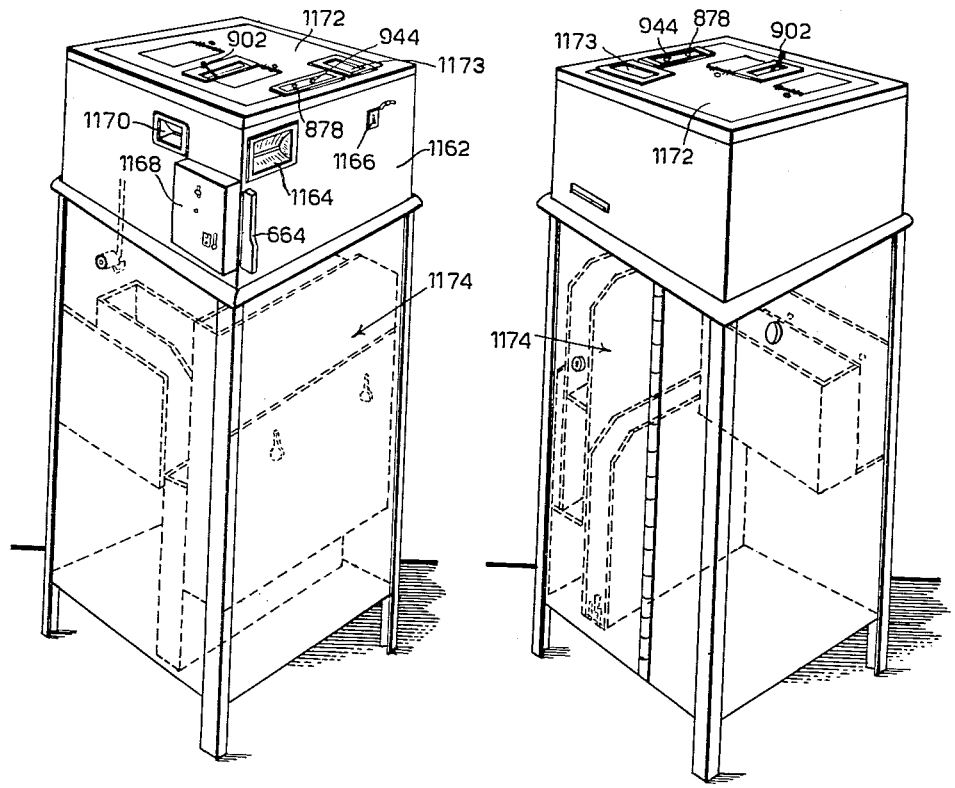
Figure 33 is a perspective view showing in particular the front and right-hand sides of the case of the machine.
Figure 34 is a perspective view showing in particular the back and left-hand sides of the machine.

The mechanical unit which contains the major operating parts of the machine is located in a housing 1162 which is illustrated in Figures 33 and 34. This housing is formed of sheet metal with various doors and openings for access to its interior, there being provided locks to prevent unauthorized access thereto. The opening 1164 is aligned with the slug guide and permits insertion of the slugs. The opening 1166 is provided to receive the operator's key. At 1168 there is indicated the cover for the card printing mechanism which has been previously described, the card being inserted into the card guideway 664 which projects through the housing. At 1170 there is indicated the ticket exit. The top cover plate 1172 is provided with openings giving access to the various manually manipulable elements such as 878, 902 and 944 previously described. Glass covered openings may be provided for viewing the interior of the machine as, for example, that at 1173 through which the entries on the record strip may be viewed. Supply bins generally indicated at 1174 are provided for holding supplies of the ticket stock, record strips and carbon sheets and also for receiving the record strips and used carbon strips which, however, may, if desired, be fed through openings to the exterior of the machine for disposal.

Figure 35:
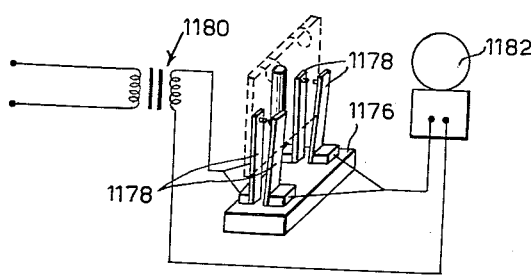
Figure 35 is a diagram illustrating the signalling means operating upon exhaustion of the ticket strip.

A signalling arrangement is provided in the bottom of the housing for indicating exhaustion of the ticket strip. This, illustrated in Figure 35, comprises an insulating base 1176 carrying spring contact fingers 1178 between which the final areas of the ticket strip may be located so as normally to hold open a circuit including the secondary of a transformer 1180 and a signal bell 1182. When the ticket strip approaches exhaustion the bell will ring warning the operator that the strip must be replenished.

Figure 36:
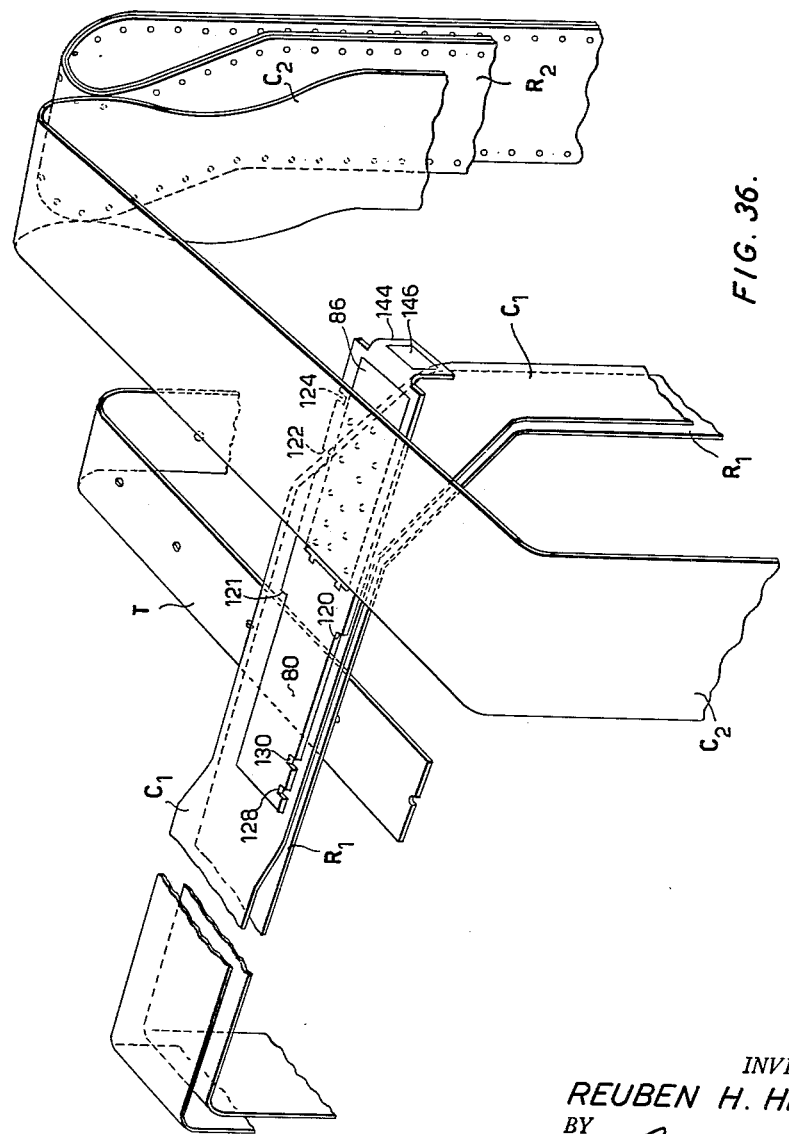
Figure 36 is a perspective diagram illustrating in particular the paths of various paper strips through the machine and their association with a slug.

Figure 36 is in the form of a perspective diagram indicating the nature of the movements of the various paper strips in the machine.

The ticket stock indicated at T is advanced in a direction toward the front of the machine beneath an inserted slug which is also indicated in Figure 36. The ticket stock may consist of a single thickness of heavy paper such as is customarily used for railroad tickets or, alternatively, if it is desired that the patron should retain a receipt, the ticket stock may consist of a strip of paper having a longitudinal fold with a carbon backing on the inside of the upper fold. It will, of course, be evident that even three or more folds may be provided. The ticket stock may be preprinted in any fashion desired for the particular intended use with those standard matters which are invariable, such as the name of the carrier, conditions of sale, indications of what the machine-printed matters may mean, reservation indications, boxes for insertion by the seller of various notations, etc. Such preprinted matter is indicated in the case of the railroad ticket issued in Figure 37 to which furher reference will be made. The ticket stock is provided with openings for engagement by the pins of the feeding pin wheel and it may be perforated transversely so that the various individual coupons may be readily torn from a multiple coupon ticket. A longitudinal line of perforations may also be provided along the fold line in case of a double ticket stock to permit receipts to be severed from portions retained by a conductor or other attendant. It will be clear from the above that the machine is highly versatile in permitting many variations in the general physical nature of the ticket to be issued.

Fed from right to left across the machine and between the slug and the ticket stock are a record strip $R_1$ and a carbon strip $C_1$. The record strip is provided to have printed thereon the matter which is printed by the machine on each ticket so as to furnish a permanent record of the tickets. This record strip is in the form of a strip of paper having carbon coating on its underside for the purpose of printing the upper faces of the tickets. This record strip is fed in relatively large steps by the high speed feeder previously described so as to present a clean portion thereof for printing at the time each ticket coupon is printed.

The carbon paper strip $C_1$ has a carbon surface on its lower side and may be fed relatively slowly through the machine. Both of these strips may be accumulated in the lower portion of the housing or, if desired, the carbon strip may be fed through a slot to the exterior of the housing to be disposed of from time to time. It is desirable that the record strip be retained in the housing to be removed from time to time by an authorized person to be kept as a record. It will, of course, be evident that if not desired the record strip just mentioned may be omitted, in which case the high speed feeding mechanism may also be omitted.

Figure 7:
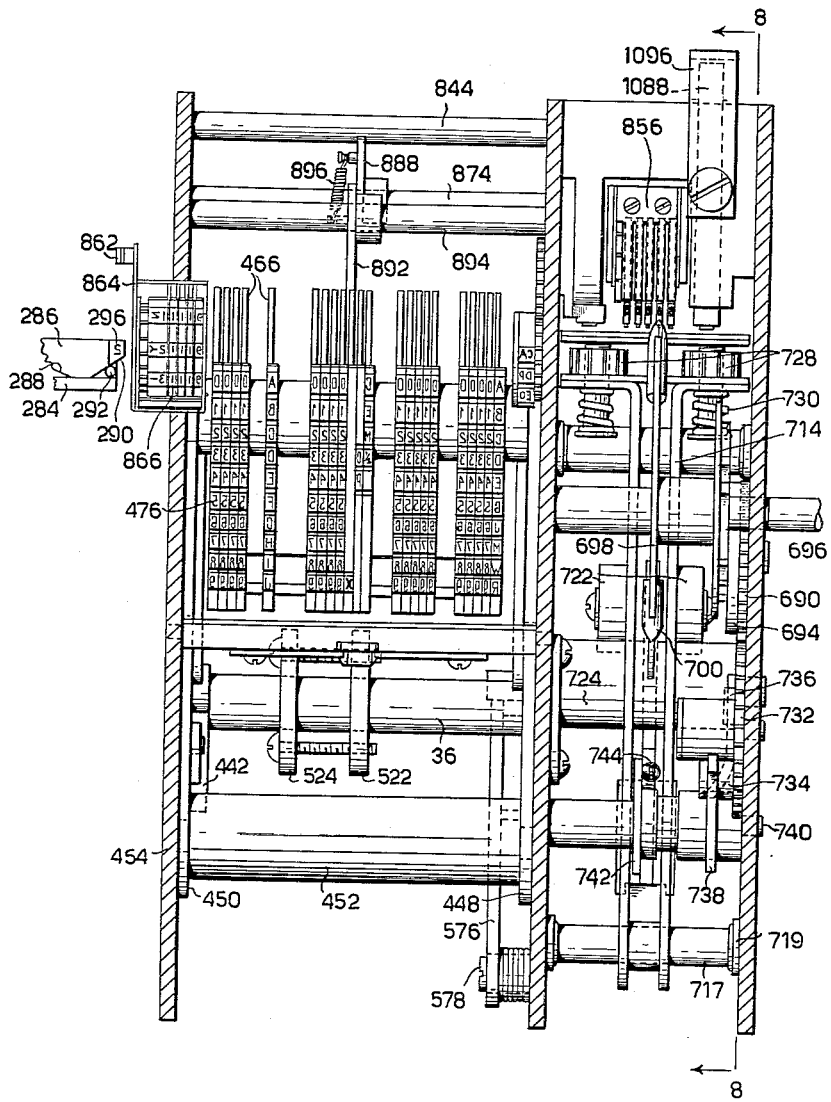
Figure 7 is a vertical section taken on the broken surface indicated at 7—7 in Figure 1B.
Figure 38:
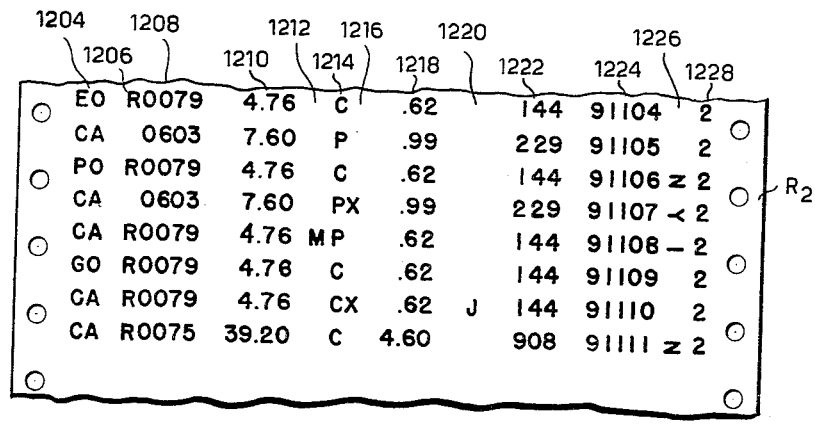
Figure 38 is a plan view of a portion of a record strip printed by the machine in a ticket issuing cycle.

The record strip $R_2$ which is more fully indicated in Figure 38 is fed to be printed by the elements indicated particularly in Figure 7. It passes upwardly over the feeding roller 638 as previously described and thence downwardly to be retained, if of single thickness, in the housing of the machine to be removed from time to time by some authorized person. However, more generally it is desirable to use two record strips superimposed on each other with the one which passes nearer the type faces having carbon on its back to print the other. In such case the strip which is outermost in its downward movement may emerge from a slot in the housing to be removed from time to time and retained by the operator as a record of his activities. The other strip is desirably retained in the housing. In order to effect printing on the outermost record sheet or on a single record sheet if only one is used, there is provided the carbon paper $C_2$ which rises with the record strip or strips $R_2$, passes forwardly over the unit thence downwardly past the accumulators to the feeding take-up illustrated in Figures 25 and 26. Thus this carbon is available for the printing of the opening and closing entries on the card of Figure 24. This carbon strip $C_2$ may be either accumulated inside the housing or may be fed to the exterior of the housing to be disposed of from time to time.

Figure 37:
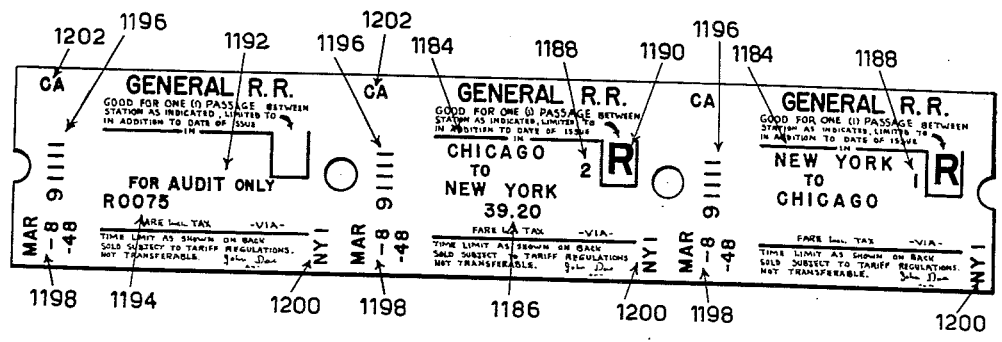
Figure 37 is a plan view illustrating a typical ticket such as may be issued from the machine.

Before proceeding with a description of a typical operation of the machine and the variations which are possible, reference may be made to the matters which are printed on the ticket coupons, the record strips, and the totalizer card. As will be evident from what has been described, certain matters are printed on the ticket coupons and on the record strip $R_1$ by the type faces on the slug. Such matters as indicated in Figure 37 may include the stations of origin and destination as indicated at 1184, the total price as indicated at 1186, the number of the coupon of the multicoupon ticket at 1188, whether or not the ticket is a return ticket at 1190, the particular designation of an audit stub at 1192, a route designation at 1194 or any other matters which may be special and individual to a particular type of ticket. It will be clear that what is thus printed by the slug is arbitrarily at the disposal of the particular carrier using the machine. In addition to such matters as are printed by the faces on the slug there is provided on each coupon the serial number of the ticket as indicated at 1196, this being printed by the numbering head 856, the date at 1198 printed by the set of slugs 1090, 1092 and 1094, the number of the machine indicated at 1200 printed by the slug 1088 and the nature of the transaction involved printed at 1202 by the selective element 926. It may be here pointed out that in the printing of the last coupon to be issued in a particular cycle of the machine the slugs print the date on this coupon but the designation of the machine shown at 1200 is in that printing operation printed on the advancing end of the ticket strip which will form the first coupon of the next ticket to be issued. This is a matter of convenience making it possible to utilize both spaces near the ends of a ticket coupon.

The type of entries made on the record strip $R_2$ is indicated in Figure 38 which may be considered in connection with Figure 7 showing the type faces which print this record. In the column indicated at 1204 there are printed conditions of sale, this printing being, as previously described, selective under control of the operator.

In the column 1206 there may be printed various code designations as may be determined by projections on the slug; for example, the letter R may designate return trip tickets.

In the column 1208 there is printed the route designation which may be given in the form of a multiple digit number.

In column 1210 the total fare, including tax, is printed though, if desired, there may be here printed the total fare less the tax.

In column 1212 there may be printed special designations of tickets such as half-fare tickets, clergy tickets, or the like. Column 1214 likewise contains arbitrary designations and in the example illustrated these comprise "P" for "pullman" and "C" for "coach."

Column 1216 is illustrated as printing the designation "X" standing for tax exempt. The printing in the column is under the control of the operator as specified above.

In column 1218 there is printed the tax.

In column 1220 there may be printed various letters or other characters having arbitrary significance.

Mileage is printed in the column 1222.

The serial numbers of tickets issued are printed in the column 1224.

In column 1226 there may be printed the identification of the machine and this may conveniently take the form of a repeated designation on the unit wheel of the serial number counter or head 866.

Finally the last column 1228 prints the operator's designation from his key.

It will be evident that what is printed on the record strip is subject to wide and arbitrary choice. It will be evident that the entries may be readily made to conform to the requirements of railroads, airlines, bus lines, boat lines, or other carriers, and the particular accounting practices of these carriers. In general, all items which are necessary for accounting may be recorded.

While the record formed on the strip R₂ is very complete it is convenient to have a totalled record corresponding to each tour of duty of an operator of the machine or, alternatively, to have various accumulated totals at particular periods. This end is accomplished through the use of the totalizer card printed by the totalizer or accumulator mechanism which has been described. This card is illustrated in Figure 24 and, as shown therein, may be provided with various boxes into which data or remarks may be written in addition to the entries printed by the totalizer. As indicated in Figure 24, each card may be printed at opening and closing times with entries from the totalizer and associated printing elements as follows:

In column 1230 there is printed the machine designation.

In column 1232 there is printed the total fare including tax or, if desired, the fare excluding the tax, depending upon the set-up of the slugs.

In column 1234 there is printed the tax.

In column 1236 there is printed the total mileage.

The opening and closing ticket numbers are printed in column 1238.

The arrangement of the opening entry below the closing entry makes it possible to effect subtraction conveniently to provide a record of the activity of the machine between opening and closing.

Comparing Figures 24, 37 and 38, it will be noted that the last entry on R₂ is that of the ticket illustrated in Figure 37 and that the closing entry on the totalizer card corresponds to the printing of this card following the issue of the ticket of Figure 37.

The drawings illustrate the machine in a condition of rest with an operator's key inserted so that the machine is ready for operation upon the insertion of a slug, Figure 31 being an exception to this since it shows the parts associated with a key in the position assumed prior to key insertion. Figures 22 and 23 show an adjustment made which will normally prevent the printing of a plate related in the fashion of printing plate 134 to the end 138 of a slug. In order to describe the operation there will be assumed the desire to issue a ticket having coupons in excess of six, and accordingly, requiring the successive use of a pair of slugs, the ticket being issued with omission of an audit stub. In this case the first slug to be used may be assumed to carry six coupon printing plates all of which are to be printed, including that which occupies, with respect to the end 138 of the slug, the position of the plate 134. To insure printing of the final coupon by this slug the slug will carry a member 140 as is indicated in Figure 16. Furthermore, in order to prevent cutting off of the ticket at the end of operation by this first slug the slug will be provided with a shoulder in the position 120'.

In contrast, the second slug which completes the printing of the ticket may be assumed to carry an audit stub plate which is not to print and, accordingly, this slug would not have on it the member 140. Furthermore, to insure cutting of the ticket following the completion of the last printed coupon the shoulder on this slug will be in the position 120.

When two or more slugs are required to print a complete ticket the fare, tax and mileage designations by projections on the slug will be carried by only one of them, the others of the set having projections in the first position so as not to effect printing of these items on the record strip and the totalizing of these items in the accumulator.

The operation may now be described.

Preliminary settings may be made of the lever 902 and the lever 878, the former to designate the nature of the sale to be effected and the latter to its tax exempt position if the sale is of that type.

As the slug is inserted in the guideway 81 the first event which occurs is the rocking of the finger 952 to carry the shoulder 956 to a position such that the end of the link 958 will be engaged thereby after this link is displaced and released. However, at this time the sole action which occurs is that of moving the link 958 against the action of the leaf spring 962.

As the slug moves further inwardly, assuming as mentioned above that it carries a member 140, this member will engage the end of the plate 207 rocking the hub 186 and causing the nose 190 of the arm 188 to enter the slit 128 in the slug edge. The nose 192 of arm 188 is released from the shoulder 194 and, consequently, the slide 178 is free to move toward the left of the machine. As the slug advances further the rollers 234 will be guided by the slot 246 and will raise the lever 248 lifting the link 806 and the link 798 and at the same time moving the link 256 to rock through link 266 the lever 272. Since the key is inserted the levers 300 and 300' will be in a position to permit the pin 278 to pass through the openings 304 with the result that the lever 272 may rock to enter the nose 282 into the slot 294 in the upper edge of the key. The key is thus locked in position so that it cannot be withdrawn until the slug is withdrawn from the machine. It may be here noted that if the key were not inserted the lever 272 would be restrained against movement and would prevent rearward movement of the slide since the lever 248 could not rock to permit the release of the roller 234 seated in the socket 250 therein.

As the slug moves toward the left the disc 240 will be rotated camming outwardly the ear 770 carried by the knife control plate 764, the result of this action being to move the knife pusher 748 outwardly to cause the shoulder 750 to clear the knife carrier. In the same operation the roller 358 is disengaged from the yielding latching lever 352 and the pin 310 is rotated from its position illustrated in Figure 5 to clear the end 312 of the lever 314.

As the slug approaches its final position the shoulder 120', which has been assumed as on this slug, will engage the ear 786 on the lever 784 rocking through the link 778 the lower end of the lever 796 behind the plate 764 so as to prevent the inward movement of this plate and the knife pusher even if the ear 770 later entered the opening 772 in the disc 240. As has been previously described, friction holding is imparted by the spring 794 and link 788 to the lever 796 so that this position of the last mentioned lever is maintained until it is forcibly rocked by the link 798.

As the final position of the slug is approached shoulder 121 engages the end 78 of the lever 76 forcing the hook of link 64 into the notch 122 whereupon this link is dragged toward the left of the machine causing release of the lever 46 by the hook 54. When the slug reaches its final position the end 43 of the lever 46 will drop into the slot 124 in the slug under the action of the spring 50.

This last movement trips the machine into operation. Lever 38 rocks counterclockwise as viewed in Figure 4. As it rocks, which it is free to do since lever 342 is held outwardly in the position shown in Figure 1B, its depending arm 153 will clear the cam end 158 of lever 154 pulling on the link 164 and thereby closing the switch 170. Furthermore, as the lever 38 rocks, its arm 40 will release the pin 24 and the gear segment 20 carried by the gear 16 will mesh with the pinion 14 on the shaft 12 which is directly driven from the motor through the reduction and bevel gearing. The result of this is the driving of the shaft 36 in a counterclockwise direction as viewed in Figure 4. It may be noted that reverse movement of this shaft 36 was previously prevented by the location of the lever 576 below the pin 336.

Immediately at the beginning of rotation of the shaft 36 the frame comprising the levers 448 and 450 is rocked clockwise as viewed in Figure 11 causing the pin 462 to move downwardly. Through the individual latches 471 associated with plates 466 they are yieldingly rocked clockwise as viewed in Figure 9 carrying with them the fingers 480 which drop off the ledge at the side of the guideway 81 upon the upper surface of the slug. In so dropping, the pointed noses at the ends of the fingers are lowered to clear the serrations 481 until they engage corresponding projections 88, 92 or 106 on the slugs. When one of these projections is engaged the end of the finger is raised to catch on one of the serrations corresponding to the projection so that it is positively arrested, its latch 471 thereafter yielding against the action of its spring 472 as the pin 462 continues to move. The effect of this is that when the pin 462 reaches the end of its movement each of the plates 466 will be positioned to present for printing the proper character or numeral 476, or a blank, corresponding to the set-up of projections on the slug.

There is one exception to this, namely, the finger 480' illustrated in Figure 30. If the lever 878 is in a position corresponding to the payment of a tax the finger 480' will be restrained by the action of the nose 898 of the lever 892 on the shoulder 900 of the finger. However, if the transaction is tax exempt and the lever 878 is correspondingly set the end 898 of lever 892 will clear the shoulder 900 and the finger 480' may move to its extreme position against the end 485 of its guide passage so as to present in printing position the character "X" which indicates the tax exempt transaction.

As the various plates 466 are rocked and positioned as just described the segments 482 will be correspondingly rocked and, with the lag provided by the slots 490, the segments 486 will also be correspondingly rocked. At this time these last segments are clear of the corresponding gears 526 since the accumulator frame is in a left-hand position as viewed in Figure 11. After the completion of the movement of the plates 466, however, this accumulator frame is rocked by the action of its controlling cams on shaft 36 to produce meshing of the gears 526 and the segments 486.

In the meanwhile, the rocking of the frame constituted by 448 and 450 will, through the link 610, rock hammer-carrying frame 604 in a counterclockwise direction as viewed in Figure 11. By the action of the shoulder 621 of the lever 622 on the pin 619 the hammer is restrained during this action and spring 617 is accordingly tensioned.

After the plates 466 reach their final positions lever 492 is rocked by the cam 440 to cause the upturned edge of the plate 500 to engage between teeth 474 of the plates to lock them in definite position so that they will not become displaced during the printing operation and produce blurred printing. Following this locking action the pin 626 will engage the end of lever 622 to release the hammer 618 to produce printing of the record strip R₂, the action of the hammer being as described above involving release of pressure against the record strip immediately after the blow is struck thereby preventing any blurring.

While the plates 466 are locked, the accumulator frame is rocked clockwise as viewed in Figure 11 to effect meshing of gears 526 with their corresponding segments 486.

Before the pin 626 releases the hammer it will engage the lower end of the lever 964 rocking this counterclockwise as viewed in Figure 12 to move the link 958 toward the left. When the lever 964 is released by the pin 626 it may move under the action of the spring 968 but the link 958 will then be restrained against full movement by engagement with the shoulder 956 on the finger 952. Accordingly, there is no action of tripping the shaft 874 or the shaft 894 from their adjusted positions.

Following the operations already described the lever 494 rides down its cam 440 to release the plates 466. The pin 462 now moves upwardly so that the plates are returned to their original rest positions. As they do so (it being noted that the return is positive due to the engagement of the pin 462 in the upper ends of the slots 468 where it is located above the shoulders of latches 471) the accumulator gears 526 will be advanced through the action of the segments 482 and 486, the advance continuing until the latter segments engage the stop pin 493. As a result, the accumulator numbering wheels are advanced to add the proper amounts except for the delayed carrying action which occurs later. Following the completion of this accumulator action its frame is rocked so as to carry the gears 526 out of mesh with the segments 486.

The downward movement of the pin 462 causes it to engage the arm 1066 of the member 1068 and through the link 1072 and the yielding connection with the lever 1078 the slide member 1082 is operated to act upon the slug counter to advance this counter by one unit.

After approximately a half revolution of the shaft 36 the roller 336 engages the lever 332 which, in turn, rocks lever 326 releasing the link 322 which moves toward the left as viewed in Figure 5. As will be shortly pointed out, this starts the cycling of the printing and slug returning mechanisms. As the link 332 moves under the action of spring 324 after being thus tripped the push rod 340 is released, in turn releasing the lever 342 to cause it to bear against the depending arm 153 of the lever 38. The pin 351 thereafter engages the arm 353 of the lever 38 rocking this clockwise as viewed in Figure 4 to restore it to a position to engage the pin 24 by its arm 40 thereby to disengage the clutch shown in Figure 4. To prevent subsequent rotation of the shafts 30 and 36 during the remaining complete cycle of the machine the lever 342 will move inwardly to present the shoulder 348 to the rear of the arm 153 of lever 38 preventing counterclockwise movement thereof even after the pin 351 clears the arm 353. Rocking of lever 38 by pin 351 effects removal of nose 43 of lever 46 from the slot 124 in the slug. Ear 52 is then positioned to be latched by hook 54 as soon as the slug moves outwardly.

Referring now to Figure 9, it will be noted that during the rotation of the shaft 30 concurrently with the shaft 36 the arm 604 will revolve and will, shortly before it concludes the revolution, engage the pin 596 carried by the gear 586 which is revolvable on the shaft 30 and carries the stepped cam element 572. A break in the continuity of the teeth of the gear 586 was up to this point opposite the pinion 584 on the shaft 12. However, as the gear is revolved by the action of 604 on the pin 596 the yielding segment 592 will be brought into mesh with the pinion and consequently the gear 586 will continue to revolve even after the arm 604 reaches its final position of rest. The rotation of this gear 586 will impart a complete rotation to the cam member 572 causing the stepped cams thereon to act on the portions 562 of the levers 558 to effect carrying between the orders in ascending sequence with the result of completing the totalizing operation of the accumulator. The gear 586 finally stops in its normal rest position when the pin 596 enters the notch 597 in the spring controlled detent lever 598, this position of rest corresponding to the unmeshing of the gear 586 from the pinion 584.

As will be evident, the completion of rotation of the shafts 30 and 36 and of the gear 586 will have restored to original position those parts of the machine having to do with the printing of the record strip $R_2$, the addition of the proper matters in the accumulator and the operation of the slug counter. Overlapping this cycle by the tripping of the link 322 as stated the printing cycles of the machine will have been initiated.

Reference may now be made to Figure 5. As the link 322 moves toward the left under the action of spring 324 lever 314 is rocked clockwise. As this takes place the lever 378 is rocked counterclockwise so that its depending end will engage and hold in circuit closing position the movable element 168 of the switch 170. This action occurs before the lever 154 is rocked by 153 in a direction which would permit the switch to open and, consequently, the switch is held closed and the motor maintained energized, the pin 160 being free to move in the elongated slot provided by the loop 172 at the end of the connection 164.

The rocking of the lever 378 also releases its end 384 from the shoulder 386 of the cam 388.

The rocking of the lever 314 releases the pin 364 with the result that the movable gear segment 368 may be rocked by the action of spring 372 into mesh with the pinion 373 on the shaft 6 so as to impart clockwise rotation as viewed in Figure 5 to the shaft 373.

The rocking of the lever 312 also effects release by its nose 396 of the small lever 398 which, in turn, releases the lever 390 for counterclockwise movement to carry its tooth 392 into the space between the teeth 394 of the plate 240 which is then opposite this tooth. The result is to lock the plate 240 in a definite position, in turn resulting in a locking of the slug with the innermost printing plate 136 in position for printing.

Figure 8:
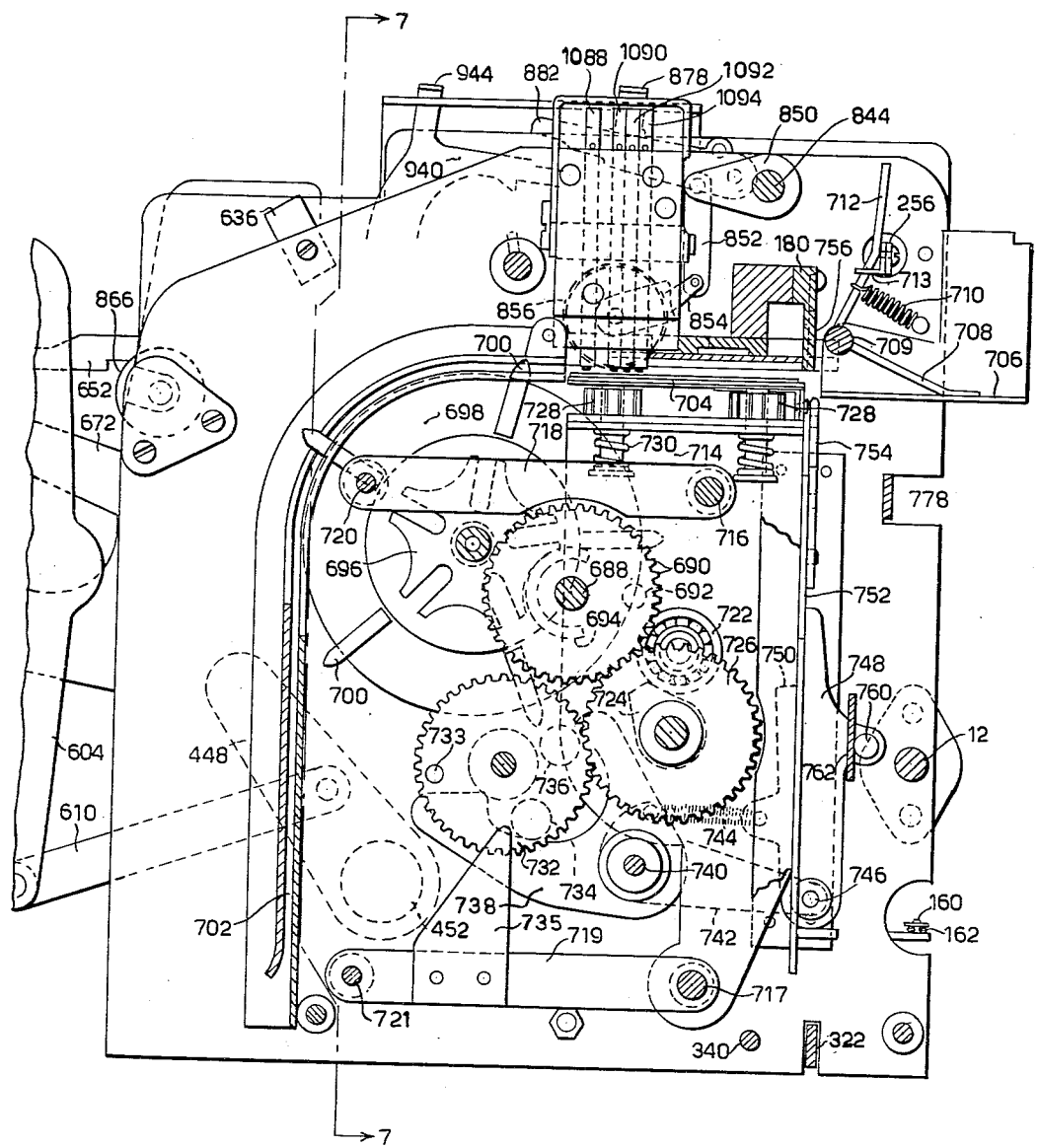
Figure 8 is a vertical section taken on the plane indicated at 8—8 in Figure 7.

As the shaft 373 revolves it rotates the shaft 688 through the bevel gears 684 and 686 and with the shaft 688 the gear 690 which drives the gears 726 and 732. As will be noted from Figure 8 the first event will accordingly be the action of the cam 724 on the rollers 722 to raise the printing platen 704 to effect printing by the elements which are located above this platen including the printing plate on the slug, the slugs 1088, 1090, 1092 and 1094, the numbering head 856 and the member 926. Accordingly, the face of the ticket coupon is printed and simultaneously there is printed the same matter on the record strip $R_1$. The release of the platen occurs as the cam 724 clears the rollers 722.

Following the printing the pin 692 will effect advance of the pinwheel 698 through the Geneva driven member 696 and the ticket strip will be advanced over the plate 706, the holding finger 708 having been released by the action of the cam 713 as the link 256 was moved in the beginning of the operation of the machine. The pinwheel advances the strip through a distance corresponding to the length of the ticket coupon. Consequently, at the end of the feeding movement the end of the first coupon on the ticket strip will be aligned with the cutting plane of the cooperating knife members 754 and 756.

Cutting, however, will not occur. The pins 734 and 736 will act on the bell crank 738 to impart an oscillation to the knife pusher 748 but this is held outwardly by the ear 762 of the plate 764 so that the shoulder 750 will move upwardly clear of the upper end of the slot 751 in the movable knife carrier 752. The result is that the parts which have been described in Figure 8 will, after a single revolution of the shaft 373, be restored to their original positions with the ticket strip advanced one coupon length but with the coupon uncut from the supply strip.

It may be here remarked that printing by slugs 1090, 1092 and 1094 will have occurred on the ticket coupon which was projected by the feeding action beyond the plane of the knives whereas the slug 1088 which prints the machine identification on the ticket will have printed on the area which will become the next coupon to become printed and issued. The result is that the date will appear in the final coupons at the end opposite the designation of the machine.

Various other events will have occurred during the rotation of the shaft 373 through a complete revolution. Following the printing the high speed feeder for the record strip $R_1$ will be advanced to present a clean area of this record strip to the printing elements. Advance of the carbon paper $C_1$ will also be effected.

The rotation of the shaft 373 will also have advanced through the link 838 the counter 842 which registers the issuance of each coupon as contrasted with the issuance of each complete ticket. The ticket counters, however, will not be advanced since they are tied up to the operation of the knife.

Figure 6:
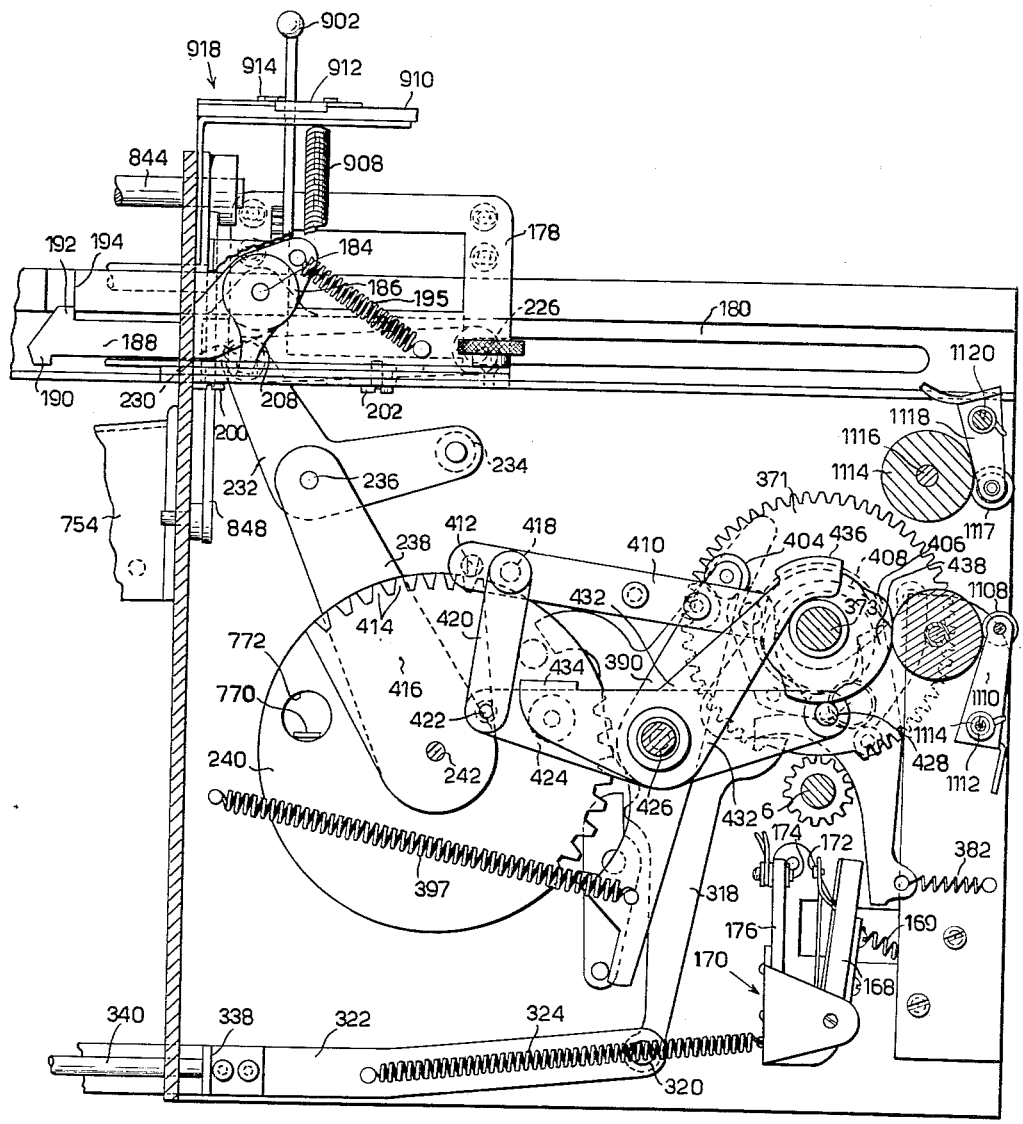
Figure 6 is a vertical section taken on the broken surface indicated at 6—6 in Figure 1A.

During the rotation of the shaft 373 there also occurs a sequence of operations to feed the slug one step outwardly. Figures 5 and 6 will make this operation clear. The feeding tooth 412 on the eccentric strap 410 is given a roughly rectangular or elliptical motion by the sequential operations imparted by the eccentric 408 and the cam 438, i. e., as viewed in Figure 5 the tooth 412 will move downwardly between teeth of the group 414 then toward the right through the spacing between these teeth then upwardly and back to its rest position. Delays at the beginning and end of the feeding stroke are provided as the eccentric moves over dead center and in the first delay at the beginning of the stroke the cam 406, acting on the follower roller 404, removes the tooth 392 from between teeth 394, while at the end of the stroke, by release of the roller 404 by the cam 406, the tooth 392 is permitted to enter again between teeth of the group 394. By virtue of these actions the disc 240 is returned one step during each rotation of the shaft 373 toward its original rest position, the movement occurring following the completion of the printing during each revolution of the shaft 373. The tooth 392 insures that following each feed and at the time of each printing operation the disc 240 is accurately positioned, in turn accurately positioning the corresponding printing face of the slug with respect to the preprinted matter on the ticket stock. The shape of the slot 246 insures movement of the slug in linear relationship with the angular movement of the disc 240.

Each rotation of the shaft 373 is accompanied by idle operations by the cam 820. This cam, by acting on the roller 818, rocks the lever 814. This lever in turn rocks the lever 802 and through it reciprocates the link 798. However, in the cycle just described this link is lifted by the link 806 attached to the lever 248 so that as it moves toward the right in Figure 2A it will move above and miss the lever 796, the lower end of which is disposed behind the plate 764. It may be here noted that the right-hand movement of the link 798 as viewed in Figure 2A occurs subsequently to the upward stroke of the knife actuator 748.

When the lever 814 is rocked the link 824 attached thereto moves toward the right as viewed in Figure 2A but is released to move upwardly by the pin 828 only after its end 832 has passed the location of the pin 320. Consequently, it merely rides under this last pin without imparting any movement to the lever 314.

The events above described occurring during rotation of the shaft 373 are repeated through the printing of subsequent coupons by successive type members on the slug until the final cycle involving the printing of the outermost type member in accordance with the assumptions heretofore made, i. e., that this type member will be printed due to the presence of a member 140 on the slug. In this last cycle printing occurs as previously described as does also the advance of the ticket strip. The last outward feeding movement is also imparted to the slug as previously described, this feeding movement sufficing to move the slug to a position of release by the nose 190 of the lever 188, i. e., this lever will return to a position where its hook 192 may rise upwardly past the shoulder 194. In this final feeding movement the opening 772 in the disc 240 is moved into alignment with the ear 770 of the plate 764. However, the lever 796 remains behind the plate 764 during the time when the knife actuator 748 moves upwardly. As a consequence, the knife is not moved to cut the ticket strip nor are the ticket counters advanced. However, immediately following the upward movement of the knife actuator, the link 798 will engage the upper end of the lever 796 by reason of the fact that the front roller 234 will move into the notch 250 in the lever 248. The lever 796 accordingly will be rocked clockwise to clear the plate 764 so that its ear 770 may drop into the hole 772 but too late to have any effect in producing cutting action.

In the final movement of the disc 240 the roller 358 will move into the socket 360 in the lever 352 to provide yielding latching of the plate 240 in final position.

Also in the final movement of the disc 240 the pin 310 will engage the laterally extending arm of the lever 314 rocking this lever counterclockwise as viewed in Figure 5. One result of this is to effect permanent removal of the tooth 392 from the teeth 394 through the intermediate action of the lever 398. Another effect is to locate the shoulder 364 in the path of the pin 366 to effect disengagement of the gear segment 368 from the pinion 375 when the shaft 373 approaches its final position.

Still another effect is to release the lever 378 so that as soon as the shoulder 386 of cam 388 clears the end 384 of this lever it will release the switch member 168 which will open under the action of its spring. This occurs at the extreme end of the cycle, the end 384 of lever 378 then preventing retrograde movement of the shaft 373 under the action of spring 372 which might otherwise cause remeshing and chattering as the shaft 6 continues to spin by reason of the inertia of the motor.

When the lever 318 is positioned as described by the pin 310 the pin 320 will be positioned to the right of its former location and consequently as the link 824 is reciprocated toward the right in Figure 2A it will, upon release upwardly by the pin 828, so rise that its end 832 is in position to engage the pin 320. This pin is consequently given a sharp kick which will serve to move the link 322 to the right to be latched by the action of the lever 326. When so latched the end 312 of the laterally extending arm of lever 314 is moved clear of the pin 310, a condition which is desirable to minimize resistance to movement of the pin 310 when the next slug is inserted.

The lever 342 is pushed outwardly by the rod 340 releasing the lower end 153 of the lever 38. This lever, however, is already latched by the action of the nose 54 of the lever 56 on the lug 52 of the lever 46, this latching having occurred considerably earlier as soon as the slug received its first step outwardly.

As will be clear from the foregoing, all of the parts will now have been restored to their original positions. The printed coupons of the ticket will still remain attached to the supply strip and the ticket counters will not have been advanced. The slug is now free to be withdrawn.

It will, however, at this time still remain temporarily held in the guideway and will hold the finger 952 in position to restrain right-hand movement of slide 958 as viewed in Figure 12.

As the slug is completely removed from the guideway the finger 952 will be released and consequently the slide 958 will be snapped toward the right as viewed in Figure 12 by the action of spring 968 through the lever 964. This will result in restoring shafts 894 and 874 to their normal positions as described in detail above. It may be here noted that in accordance with the assumptions made that a long ticket requiring the use of two slugs is being produced the shafts 894 and 874 will have to be manually reset; however, such long tickets are the exception rather than the rule and it would not be worthwhile to complicate the mechanism to provide that the setting of these shafts would not be disturbed in this operation.

It may now be assumed that the second slug to complete the ticket is to be inserted in the machine. This slug will be assumed not to carry a member 140 with the assumption that the screw 211 is so set in right-hand position as to prevent the issue of an audit stub to which the outermost printing plate on the slug corresponds. It will also be assumed, since the ticket is to be cut off following operation by this second slug, that the slug has the shoulder in the position 120 rather than in the position 120'. The slug is inserted following resetting of the shafts 874 and 894.

As the slug is moved inwardly everything occurs as before with two exceptions. One of these is that the slide 178 is not moved until the end 138 of the slug engages the end 210 of the abutment plate. In view of the right-hand position of this plate (as viewed in Figures 22 and 23; actually left-hand facing the machine) the movement of the slide is one unit length less than it would be if the plate were provided with a member 140 or if the screw 211 was in the left-hand position as viewed in Figures 22 and 23.

The second difference is that the shoulder 120 will not engage the ear 786 of the arm 784 so that the lever 796 will not be swung behind the plate 764.

The cycles of the machine now proceed in the same fashion as previously described with certain exceptions which will be now referred to.

First, the slug will be provided, at least so far as the accumulators are concerned, with projections in positions to arrest the corresponding fingers to prevent movements of the corresponding plates 466. This, as will be evident, will prevent any addition of amounts in the accumulator.

Secondly, prior to the last cycle, operation of the knife is prevented solely due to the fact that the ear 770 of the plate 764 rides on the surface of the disc 240 as contrasted with the additional possible restraint of the plate by the lever 796 in the previously described type of operation.

In the last cycle printing and feeding of the ticket strip takes place as previously described but as the feed of the slug is completed the opening 772 in the disc 240 is moved to its final position wherein the ear 770 is released so that the plate 764 moves inwardly under the action of spring 768. The knife actuator 748 is pulled inwardly by the spring 744 so that as it now reciprocates the knife slide will be moved with resultant cutting off of the ticket. This cutting off action occurs subsequently to the restoration of the lever 248 to its rest position by the entry of the outer roller 234 into the notch 250. Accordingly, the link 256 will have been moved toward the left so that the clamping finger 708 will have been released by the cam 713 to engage and yieldingly hold the ticket on the plate 706.

The upward movement of the knife carrier 752 effects, through the link 848 and the other connections, an advance of one unit of all of the numbering heads. This advance results in setting the numbering heads which print on the ticket and on the record strip R2 to the serial number of the next ticket to be issued while the numbering head 872 which prints on the cards will be set to the serial number of the ticket which had just been issued.

The restoration of all of the parts to their initial conditions will be effected as previously described, the slug being released so that it may be withdrawn from its guideway. In such withdrawal it will release the finger 952 to effect resetting of the shafts 894 and 874.

It will be evident that if the screw 211 had been set in the left-hand position as viewed in Figures 22 and 23 the machine would have performed one additional coupon-issuing cycle before cutting off the ticket strip and coming to rest to provide an audit stub similar to that illustrated in Figure 37. Alternatively, the issue of an audit stub, irrespective of the setting of the screw 211, could have been insured by providing the slug with a member 140.

From the foregoing descriptions of the construction and operation of the machine it will be evident that it is adapted to a very large number of practices which may be followed by carriers in their issuing and accounting of tickets. By change of type faces on the slugs and the other elements of the machine various code or other designations may be adopted to suit the requirements of the machine user. By utilizing folded ticket stock with suitable carbon coatings tickets may be issued in duplicate or triplicate. Likewise, multiple records may be produced through similar use of multiple record strips or cards. It will, of course, be evident that if not required the machine may be simplified by omission of various parts; for example, if it is not desired to retain a record strip such as R1 containing the matter printed on the tickets the feeding device for such a strip may be eliminated. Likewise, the totalizer card printing mechanism may be omitted, if desired, in which case the accumulator heads may take the form of indicators rather than printing devices. It will be evident, furthermore, that merely by changing the width of the right-hand section of the machine it may be arranged to contain more than the three sets of accumulators if more elaborate totalizing is to be effected.

It may be noted that the purpose of providing audit stubs is particularly for cases in which a rate may be changed and tickets are to be issued using slugs which have not been changed to indicate the new rates. In such case the operator issuing the tickets may write in the new rates and also retain an audit stub to show a correction to be made in the record R2 produced by the machine. Other instances may likewise occur, the audit stubs being used to keep accounting of special rates or the like.

It will also be evident that certain slugs may be provided for the issue of blank tickets to points involving very little traffic for which purpose the operator could write in the destinations and other data and retain an audit stub for the purpose of keeping a record of the transaction, the record R2 in this case indicating for example, only the issue of the special blank type of ticket.

While reference has been particularly made to the issuance of multiple coupon tickets it will be evident that slugs may be provided carrying only a single printing plate for the issue of simple one-way tickets to major points. Such a slug may be provided with a member 140 which, in such case, will control the issue of the single coupon ticket without there being involved the matter of an audit stub.

It will accordingly be apparent that the invention is not to be construed as restricted except to the extent required by the following claims.

What I claim and desire to protect by Letters Patent is:

1. A ticket issuing machine comprising means for guiding and feeding a ticket strip intermittently during a single complete cycle of operation through a distance corresponding to the length of a plurality of coupon areas thereon to issue a ticket having such areas, means for receiving successive slugs each having one or more printing faces thereon, printing means for causing each slug to make at least one impression on a ticket, a numbering mechanism for printing numbers on said coupon areas, means controlled by a slug inserted into the machine for effecting printing of the ticket strip a number of times corresponding to the number of printing faces on the slug, means for severing the ticket strip following printing by the printing faces on the slug and feed of the strip, means for advancing said numbering mechanism, and means for rendering the severing means and said advancing means selectively and concurrently operative or inoperative, certain of said slugs having a construction for rendering the severing means and advancing means operative, and others of said slugs having a construction for rendering the severing means and advancing means inoperative.

2. A ticket issuing machine comprising means for guiding and feeding a ticket strip intermittently during a single complete cycle of operation through a distance corresponding to the length of a plurality of coupon areas thereon to issue a ticket having such areas, means for receiving successive slugs each having one or more printing faces thereon, printing means for causing each slug to make at least one impression on a ticket, a numbering mechanism for printing numbers on said coupon areas, an accounting mechanism including a second numbering mechanism, means controlled by a slug inserted into the machine for effecting printing of the ticket strip a number of times corresponding to the number of printing faces on the slug, means for severing the ticket strip following printing by the printing faces on the slug and feed of the strip, means for advancing said numbering mechanisms, and means for rendering the severing means and said advancing means selectively and concurrently operative or inoperative, certain of said slugs having a construction for rendering the severing means and advancing means operative, and others of said slugs having a construction for rendering the severing means and advancing means inoperative.

3. A ticket issuing machine comprising means for guiding and feeding a ticket strip intermittently during a single complete cycle of operation through a distance corresponding to the length of a plurality of coupon areas thereon to issue a ticket having such areas, means for receiving successive slugs each having one or more printing faces thereon, printing means for causing each slug to make at least one impression on a ticket, a numbering mechanism, means controlled by a slug inserted into the machine for effecting printing of the ticket strip a number of times corresponding to the number of printing faces on the slug, means for severing the ticket strip following printing by the printing faces on the slug and feed of the strip, means for advancing said numbering mechanism, and means for rendering the severing means and said advancing means selectively and concurrently operative or inoperative, certain of said slugs having a construction for rendering the severing means and advancing means operative, and others of said slugs having a construction for rendering the severing means and advancing means inoperative.

4. A ticket issuing machine comprising means for guiding and feeding a ticket strip intermittently, means for receiving a slug having a plurality of printing faces thereon, printing means for causing a slug to make an impression on a ticket, means for effecting a plurality of printing operations by said printing means in cooperation with a slug between advances of the ticket strip, means for intermittently feeding a slug between printing operations so that successive coupon areas of the ticket strip are printed by successive printing faces of the slug, manually adjustable means for selectively controlling the number of coupon areas printed by a slug, and means controllable by slugs for rendering ineffective control by said manually adjustable means.

5. A ticket issuing machine comprising means for guiding and feeding a ticket strip intermittently, means for receiving a slug having a plurality of printing faces thereon, printing means for causing a slug to make an impression on a ticket, means for effecting a plurality of printing operations by said printing means in cooperation with a slug between advances of the ticket strip, means for intermittently feeding a slug between printing operations so that successive coupon areas of the ticket strip are printed by successive printing faces of the slug, manually adjustable means for selectively determining whether printing is effected by all or by one less than the total of the printing faces of a slug, and means controlled by slugs for rendering ineffective control by said manually adjustable means.

6. A ticket issuing machine comprising means for guiding and feeding a ticket strip intermittently, means for receiving a slug having a plurality of printing faces thereon, printing means for causing a slug to make an impression on a ticket, means for effecting a plurality of printing operations by said printing means in cooperation with a slug between advances of the ticket strip, means for intermittently feeding a slug between printing operations so that successive coupon areas of the ticket strip are printed by successive printing faces of the slug, manually adjustable means for selectively determining, independently of the total number of printing faces of the slug, whether printing is effected by all or by one less than the total of the printing faces of a slug, and means controlled by slugs for rendering ineffective control by said manually adjustable means.

7. A ticket issuing machine comprising means for guiding and feeding a ticket strip intermittently, means for receiving a slug having a plurality of printing faces thereon, printing means for causing a slug to make an impression on a ticket, means for effecting a plurality of printing operations by said printing means in cooperation with a slug between advances of the ticket strip, means for intermittently feeding a slug between printing operations so that successive coupon areas of the ticket strip are printed by successive printing faces of the slug, means for intermittently advancing a record strip, and means for printing on the record strip, simultaneously with the printing of coupon areas of the ticket strip, duplicates of the matters printed on said areas.

8. A ticket issuing machine comprising means for guiding and feeding a ticket strip intermittently, means for receiving a slug having a plurality of printing faces thereon, printing means for causing a slug to make an impression on a ticket, means for effecting a plurality of printing operations by said printing means in cooperation with a slug between advances of the ticket strip, means for intermittently feeding the slug between printing operations in a direction transverse to the direction of advance of the ticket strip so that successive coupon areas of the ticket strip are printed by successive printing faces of the slug, means for intermittently advancing a record strip in a direction transverse to the direction of advance of the ticket strip, and means for printing on the record strip, simultaneously with the printing of coupon areas of the ticket strip, duplicates of the matters printed on said areas.

9. In combination with a plurality of slugs each of which has at least one printing face thereon, a ticket issuing machine comprising means for guiding and feeding a ticket strip, means for receiving said slugs successively, printing means for causing a slug to make an impression on a ticket, means controlled by a slug inserted into the machine for effecting printing of the ticket strip by said printing means, and means responsive to and controlled by constructions of the slugs for severing the ticket strip following printing and feed thereof, certain of said slugs having a construction for rendering the severing means operative, and others of said slugs having a construction for rendering the severing means inoperative.

10. In combination with a plurality of slugs each of which has at least one printing face thereon, a ticket issuing machine comprising means for guiding and feeding a ticket strip, means for receiving said slugs successively, printing means for causing a slug to make an impression on a ticket, means controlled by a slug inserted into the machine for effecting printing of the ticket strip by said printing means, means for severing the ticket strip following printing and feed thereof, and means for rendering the severing means selectively operative or inoperative, to result in the production by one slug of a predetermined printed portion of a ticket unsevered from a second predetermined printed portion of the ticket produced by a subsequently used slug.

11. In combination with a plurality of slugs each of which has at least one printing face thereon, a ticket issuing machine comprising means for guiding and feeding a ticket strip, means for receiving said slugs successively, printing means for causing a slug to make an impression on a ticket, means controlled by a slug inserted into the machine for effecting printing of the ticket strip by said printing means, means for severing the ticket strip following printing and feed thereof, and means selectively controlled by different constructions of the slugs for rendering the severing means selectively operative or inoperative, to result in the production by one slug of a predetermined printed portion of a ticket unsevered from a second predetermined printed portion of the ticket produced by a subsequently used slug.

12. In combination with a plurality of slugs each of which has one or more printing faces thereon, a ticket issuing machine comprising means for guiding and feeding a ticket strip intermittently during a single complete cycle or operation through a distance corresponding to the length of a plurality of coupon areas thereon to issue a ticket having such areas, means for receiving said slugs successively, printing means for causing each slug to make at least one impression on a ticket, means controlled by a slug inserted into the machine for effecting printing of the ticket strip by said printing means a number of times corresponding to the number of printing faces on the slug, and means responsive to and controlled by constructions of the slugs for severing the ticket strip following printing by the printing faces on the slug and feed of the strip, certain of said slugs having a construction for rendering the severing means operative, and others of said slugs having a construction for rendering the severing means inoperative.

13. In combination with a plurality of slugs each of which has one or more printing faces thereon, a ticket issuing machine comprising means for guiding and feeding a ticket strip intermittently during a single complete cycle of operation through a distance corresponding to the length of a plurality of coupon areas thereon to issue a ticket having such areas, means for receiving said slugs successively, printing means for causing each slug to make at least one impression on a ticket, means controlled by a slug inserted into the machine for effecting printing of the ticket strip by said printing means a number of times corresponding to the number of printing faces on the slug, means for severing the ticket strip following printing by the printing faces on the slug and feed of the strip, and means for rendering the severing means selectively operative or inoperative.

14. In combination with a plurality of slugs each of which has one or more printing faces thereon, a ticket issuing machine comprising means for guiding and feeding a ticket strip intermittently during a single complete cycle of operation through a distance corresponding to a length of plurality of coupon areas thereon to issue a ticket having such areas, means for receiving said slugs successively, printing means for causing each slug to make at least one impression on a ticket, a numbering mechanism for printing numbers on said coupon areas, means controlled by a slug inserted into the machine for effecting printing of the ticket strip by said printing means a number of times corresponding to the number of printing faces on the slug, means for severing the ticket strip following printing by the printing faces on the slug and feed of the strip, means for advancing said numbering mechanism, and means for rendering the severing means and said advancing means selectively and concurrently operative or inoperative.

15. In combination with a plurality of slugs each of which has one or more printing faces thereon, a ticket issuing machine comprising means for guiding and feeding a ticket strip intermittently during a single complete cycle of operation through a distance corresponding to the length of a plurality of coupon areas thereon to issue a ticket having such areas, means for receiving said slugs successively, printing means for causing each slug to make at least one impression on a ticket, a numbering mechanism for printing numbers on said coupon areas, an accounting mechanism including a second numbering mechanism, means controlled by a slug inserted into the machine for effecting printing of the ticket strip by said printing means a number of times corresponding to the number of printing faces on the slug and for effecting printing by the first mentioned numbering mechanism, means for severing the ticket strip following printing by the printing faces on the slug and feed of the strip, means for advancing said numbering mechanisms, and means for rendering the severing means and said advancing means selectively and concurrently operative or inoperative.

16. In combination with a plurality of slugs each of which has one or more printing faces thereon, a ticket issuing machine comprising means for guiding and feeding a ticket strip intermittently during a single complete cycle of operation through a distance corresponding to the length of a plurality of coupon areas thereon to issue a ticket having such areas, means for receiving said slugs successively, printing means for causing each slug to make at least one impression on a ticket, a numbering mechanism, means controlled by a slug inserted into the machine for effecting printing of the ticket strip by said printing means a number of times corresponding to the number of printing faces on the slug, means for severing the ticket strip following printing by the printing faces on the slug and feed of the strip, means for advancing said numbering mechanism, and means for rendering the severing means and said advancing means selectively and concurrently operative or inoperative.

17. In combination with a slug having a plurality of printing faces thereon, a ticket issuing machine comprising means for guiding and feeding a ticket strip intermittently, means for receiving said slug, printing means for causing the slug to make an impression on a ticket, means for effecting a plurality of printing operations by said printing means in cooperation with the slug between advances of the ticket strip, means for intermittently feeding the slug between printing operations so that successive coupon areas of the ticket strip are printed by successive printing faces of the slug, and means for selectively controlling the number of coupon areas so printed by the slug.

18. In combination with a slug having a plurality of printing faces thereon, a ticket issuing machine comprising means for guiding and feeding a ticket strip intermittently, means for receiving said slug, printing means for causing the slug to make an impression on a ticket, means for effecting a plurality of printing operations by said printing means in cooperation with the slug between advances of the ticket strip, means for intermittently feeding the slug between printing operations so that successive coupon areas of the ticket strip are printed by successive printing faces of the slug, and means for selectively determining whether printing is so effected by all or by one less than the total of the printing faces of the slug.

19. In combination with a slug having a plurality of printing faces thereon, a ticket issuing machine comprising means for guiding and feeding a ticket strip intermittently, means for receiving said slug, printing means for causing the slug to make an impression on a ticket, means for effecting a plurality of printing operations by said printing means in cooperation with the slug between advances of the ticket strip, means for intermittently feeding the slug between printing operations so that successive coupon areas of the ticket strip are printed by successive printing faces of the slug, and means for selectively determining, independently of the total number of printing faces of the slug, whether printing is so effected by all or by one less than the total of the printing faces of a slug.

References Cited in the file of this patent

UNITED STATES PATENTS

| Number | Name | Date |
|---|---|---|
| 1,309,954 | Martin | July 15, 1919 |
| 1,340,221 | Fuller | May 18, 1920 |
| 1,392,929 | Fuller | Oct. 11, 1921 |
| 1,593,599 | Robertson | July 27, 1926 |
| 1,957,167 | Hoffman | May 1, 1934 |
| 2,032,387 | Zulinski | Mar. 3, 1936 |
| 2,155,928 | Brand | Apr. 25, 1939 |
| 2,325,054 | Helsel | July 27, 1943 |
| 2,339,321 | Crosman | Jan. 18, 1944 |
| 2,356,667 | Helsel | Aug. 22, 1944 |
| 2,359,855 | Gruver | Oct. 10, 1944 |
| 2,365,381 | Boberg | Dec. 19, 1944 |
| 2,396,199 | Pfeiffer | Mar. 5, 1946 |
| 2,444,187 | Elliott | June 29, 1948 |
| 2,609,746 | Helsel | Sept. 9, 1952 |